US011887275B1

(12) United States Patent
Baker, III

(10) Patent No.: US 11,887,275 B1
(45) Date of Patent: Jan. 30, 2024

(54) ELEVATED LOOKOUT APPARATUS AND A METHOD FOR ITS USE

(71) Applicant: Excelsior S. P. LLC, Excelsior, MN (US)

(72) Inventor: Arthur Richard Baker, III, Excelsior, MN (US)

(73) Assignee: Excelsior S. P. LLC

( * ) Notice: Subject to any disclaimer, the term of this patent is extended or adjusted under 35 U.S.C. 154(b) by 0 days.

(21) Appl. No.: 17/966,676

(22) Filed: Oct. 14, 2022

(51) Int. Cl.
*G06T 7/00* (2017.01)
*G06T 3/40* (2006.01)
*G06T 5/50* (2006.01)
*G06V 10/25* (2022.01)
*B63B 15/02* (2006.01)
*G06V 10/70* (2022.01)

(52) U.S. Cl.
CPC .......... *G06T 3/4038* (2013.01); *B63B 15/02* (2013.01); *G06T 5/50* (2013.01); *G06V 10/25* (2022.01); *G06V 10/70* (2022.01); *G06T 2207/20081* (2013.01); *G06T 2207/20221* (2013.01)

(58) Field of Classification Search
CPC . G06T 2207/20081; G06T 2207/20084; G06T 2207/20221; G06T 2207/30252; G06T 7/292; G06V 10/16; G06V 10/82; G06V 10/806; G06V 20/56
See application file for complete search history.

(56) References Cited

U.S. PATENT DOCUMENTS

| 7,679,530 | B2 | 3/2010 | Waquet | |
|---|---|---|---|---|
| 2007/0188734 | A1* | 8/2007 | Waquet | G01S 17/93 356/4.01 |
| 2020/0057488 | A1* | 2/2020 | Johnson | G06F 3/04815 |
| 2021/0406560 | A1* | 12/2021 | Park | G06V 20/58 |
| 2023/0023434 | A1* | 1/2023 | Nowicka | G06V 10/454 |

FOREIGN PATENT DOCUMENTS

| EP | 1914992 A1 | 4/2008 |
|---|---|---|
| JP | 3148609 U | 2/2009 |
| WO | 2021/119366 A1 | 6/2021 |

* cited by examiner

*Primary Examiner* — Li Liu
(74) *Attorney, Agent, or Firm* — Caldwell Intellectual Property Law

(57) ABSTRACT

In an aspect, an elevated lookout apparatus is disclosed. The apparatus may comprise at least a housing mounted in an elevated location. The apparatus may additionally include a plurality of cameras positioned radially within the at least a housing in a manner to create a combined field of view, wherein each camera of the plurality of cameras is configured a generate image data. The apparatus may also include at least a processor communicatively connected to the plurality of cameras. The processor may be configured receive the image data from each camera of the plurality of cameras. The processor may also be configured to combine the image data from each camera of the plurality of cameras into a combined video using an image machine learning model.

18 Claims, 8 Drawing Sheets

ELEVATED LOOKOUT APPARATUS AND A METHOD FOR ITS USE

FIELD OF THE INVENTION

The present invention generally relates to the field of data verification. In particular, the present invention is directed to an elevated lookout apparatus and a method for its use.

BACKGROUND

It has long been challenging to accurately view and identify the areas of interest surrounding a ship. Previous methods have relied on the crew to manually look identify areas of interest from a deck level using binoculars or other. This limited view of areas of interest potentially present a danger to the ship and or the crew.

SUMMARY OF THE DISCLOSURE

In an aspect, an elevated lookout apparatus is disclosed. The apparatus may include at least a housing mounted in an elevated location. The apparatus additionally includes a plurality of cameras positioned radially within the at least a housing in a manner to create a combined field of view, wherein each camera of the plurality of cameras is configured a generate image data. The apparatus also includes at least a processor communicatively connected to the plurality of cameras. The processor is configured to receive the image data from each camera of the plurality of cameras. The processor may also be configured to combine the image data from each camera of the plurality of cameras into a combined video using an image machine learning model. The image machine learning model is configured to train the image machine learning model using an image training data, wherein the image training data contains a plurality of image data as inputs correlated to the combined video as an output. The image machine learning model is configured to combine the image data from each camera of the plurality of cameras into a combined video.

In another aspect, a method of use for an elevated lookout is disclosed. The method comprises generating, using each camera of a plurality of cameras, an image data, wherein the plurality of cameras are positioned radially within the at least a housing in a manner to generate a combined field of view, wherein the at least a housing is mounted in an elevated location. The method also includes receiving, using at least a processor, the image data from each camera of the plurality of cameras. The method may then combine, using the at least a processor, the image data from each camera of the plurality of cameras into a combined video using an image machine learning model. The method also includes training, using the at least a processor, the image machine learning model using an image training data, wherein the image training data contains a plurality of image data as inputs correlated to the combined video as an output.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

DETAILED DESCRIPTION

At a high level, aspects of the present disclosure are directed to systems and methods for an elevated lookout. The apparatus may comprise at least a housing mounted in an elevated location. The apparatus may additionally include a plurality of cameras positioned radially within the at least a housing in a manner to generate a combined field of view, wherein each camera of the plurality of cameras is configured a generate image data. The apparatus may also include at least a processor communicatively connected to the plurality of cameras. The processor may be configured receive the image data from each camera of the plurality of cameras. The processor may also be configured to combine the image data from each camera of the plurality of cameras into a combined video using an image machine learning model. The image machine learning model is configured to train the image machine learning model using an image training data, wherein the image training data contains a plurality of image data as inputs correlated to the combined video as an output. The image machine learning model is configured to combine the image data from each camera of the plurality of cameras into a combined video. Exemplary embodiments illustrating aspects of the present disclosure are described below in the context of several specific examples. In some embodiments, image machine learning model may include a neural network, such as a convolutional neural network. Neural networks are discussed further below with reference to FIGS. 5 and 6.

Figure 1:
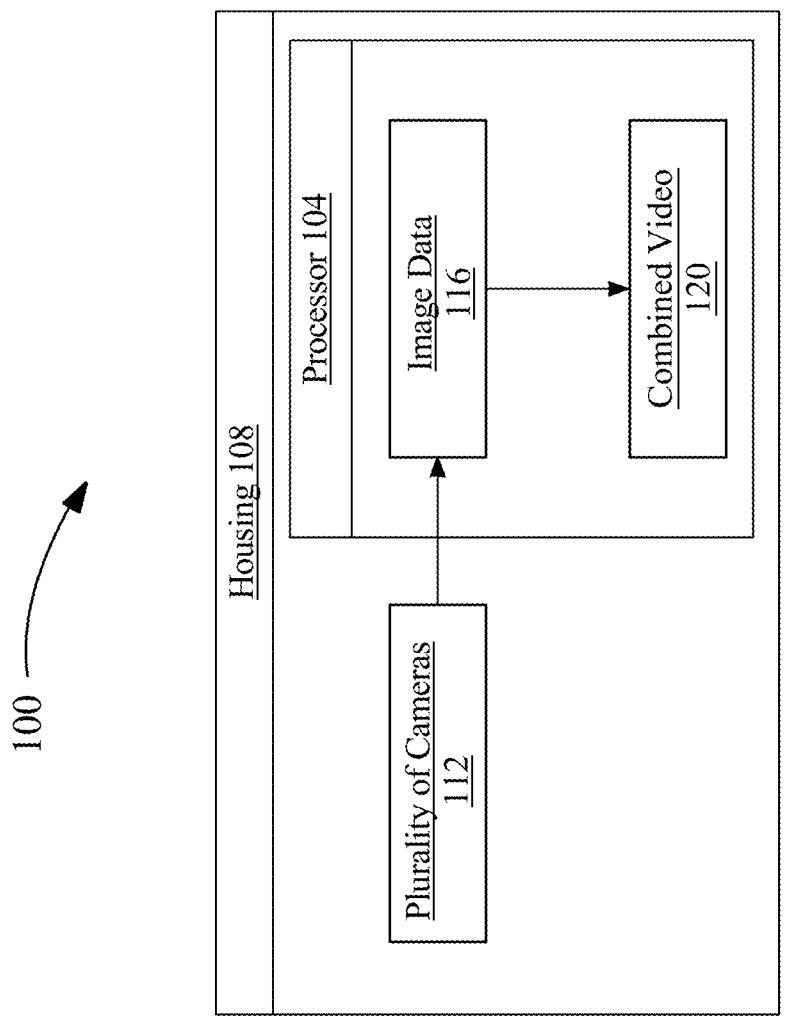
FIG. 1 is a block diagram of an exemplary embodiment of an elevated lookout apparatus.

Referring now to FIG. 1, an exemplary embodiment of an apparatus 100 an elevated lookout is illustrated. Apparatus 100 includes a processor 104. Processor 104 may include any computing device as described in this disclosure, including without limitation a microcontroller, microprocessor, digital signal processor (DSP) and/or system on a chip (SoC) as described in this disclosure. Computing device may include, be included in, and/or communicate with a mobile device such as a mobile telephone or smartphone. Processor 104 may include a single computing device operating independently, or may include two or more computing device operating in concert, in parallel, sequentially or the like; two or more computing devices may be included together in a single computing device or in two or more computing devices. Processor 104 may interface or communicate with one or more additional devices as described below in further detail via a network interface device. Network interface device may be utilized for connecting processor 104 to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software etc.) may be communicated to and/or from a computer and/or a computing device. Processor 104 may include but is not limited to, for example, a computing device or cluster of computing devices in a first location and a second computing device or cluster of computing devices in a second location. Processor 104 may include one or more computing devices dedicated to data storage, security, distribution of traffic for load balancing, and the like. Processor 104 may distribute one or more computing tasks as described below across a plurality of computing devices of computing device, which may operate in parallel, in series, redundantly, or in any other manner used for distribution of tasks or memory between computing devices. Processor 104 may be implemented using a "shared nothing" architecture in which data is cached at the worker, in an embodiment, this may enable scalability of apparatus 100 and/or computing device.

With continued reference to FIG. 1, processor 104 may be designed and/or configured to perform any method, method step, or sequence of method steps in any embodiment described in this disclosure, in any order and with any degree of repetition. For instance, processor 104 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Processor 104 may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

With continued reference to FIG. 1, apparatus 100 includes a housing 108. As used in this disclosure, a "housing" is a physical component within which other internal components are located. In some cases, internal components with housing will be functional while function of housing may largely be to protect the internal components. A housing may be configured to be water resistant or waterproof. A housing 108 may be comprised of a plurality of materials including metal, plastic, wood, fiberglass, carbon fiber, and the like. A housing 108 may comprise a plurality of openings configured to allow a plurality of cameras 112 to generate image data 116. In an embodiment, a housing 108 may house a plurality of cameras 112, a processor 104, and other mechanical or electrical equipment needed for the operation of a plurality of cameras 112. In other embodiments, a processor 104 may be located remotely from the housing 108. For instance, and without limitation, processor 104 may be located on a shipboard or on-boat computer module, console, or the like.

With continued reference to FIG. 1., a plurality of cameras 112 is located within a housing 108. As used in this disclosure, a "camera" is a device that is configured to sense electromagnetic radiation, such as without limitation visible light, and generate an image representing the electromagnetic radiation. A camera 112 may include Specialized omnidirectional cameras and rigs have been developed for the purpose of recording 360-degree video, including rigs such as GO PRO's OMNI and ODYSSEY (which consist of multiple action cameras installed within a frame), and contained cameras like the NOKIA OZO. Cameras 112 may additionally include cameras such as the RICOH Theta S, SAMSUNG Gear 360, GARMIN VIRB 360. In some cases, a camera may include one or more optics. Exemplary non-limiting optics include spherical lenses, aspherical lenses, reflectors, polarizers, filters, windows, aperture stops, and the like. In some cases, at least a camera 112 may include an image sensor. Exemplary non-limiting image sensors include digital image sensors, such as without limitation charge-coupled device (CCD) sensors and complimentary metal-oxide-semiconductor (CMOS) sensors, chemical image sensors, and analog image sensors, such as without limitation film. In some cases, a camera may be sensitive within a non-visible range of electromagnetic radiation, such as without limitation infrared. As used in this disclosure, "image data" is information representing at least a physical scene, space, and/or object. In some cases, image data 116 may be generated by a camera 112. "Image data" may be used interchangeably through this disclosure with "image," where image is used as a noun. An image 116 may be optical, such as without limitation where at least an optic is used to generate an image of an object. An image 116 may be material, such as without limitation when film is used to capture an image. An image 116 may be digital, such as without limitation when represented as a bitmap. Alternatively, an image 116 may be comprised of any media capable of representing a physical scene, space, and/or object. Alternatively where "image" is used as a verb, in this disclosure, it refers to generation and/or formation of an image.

With continued reference to FIG. 1, camera 112 may be outfitted with stabilizing equipment to stabilize camera 112 during turbulent seas. As used in the current disclosure, "stabilizing equipment" is a device designed to hold a camera in a manner that prevents or compensates for unwanted camera movement. Examples of stabilizing equipment may include gimbals with dampers and/or mechanical gyroscopes. In order to improve the overall quality of image data 116 processor 104 may be configured to implement a plurality of image stabilization techniques. As used in the current disclosure, "image stabilization" is a family of techniques that reduce blurring associated with the motion of a camera or other imaging device during exposure. Image stabilization technique may compensate, without limitation, for roll, pitch, yaw, and/or rotation of camera 112, for instance and without limitation as caused by movement of a watercraft on water and/or on waves. Image stabilization techniques may include but are not limited to optical image stabilizer, digital image stabilization, stabilization filters, and the like. In some embodiments, image stabilization may be lens based, where a floating lens element that is moved orthogonally to the optical axis of the lens using electromagnets. Camera shake may be detected, as a non-limiting example, using two piezoelectric angular velocity sensors (often called gyroscopic sensors), one to detect horizontal movement and the other to detect vertical movement. In other embodiments, image stabilization may be camera based, where camera 112 capturing the image can be moved in such a way as to counteract the motion of the camera, a technology often referred to as mechanical image stabilization. When camera rotates, causing angular error, gyroscopes may encode information to the actuator that moves the camera 112. The camera 112 is moved to maintain the projection of the image onto the image plane, which is a function of the focal length of the lens being used.

Still referring to FIG. 1, in some embodiments, apparatus 100 may include a machine vision system that includes at least camera 112. A machine vision system may use images 116 from at least a camera 112, to make a determination about a scene, space, and/or object. For example, in some cases a machine vision system may be used for world modeling or registration of objects within a space. In some cases, registration may include image processing, such as without limitation object recognition, feature detection, edge/corner detection, and the like. Non-limiting example of feature detection may include scale invariant feature transform (SIFT), Canny edge detection, Shi Tomasi corner detection, and the like. In some cases, registration may include one or more transformations to orient a camera frame (or an image or video stream) relative a three-dimensional coordinate system; exemplary transformations include without limitation homography transforms and affine transforms. In an embodiment, registration of first frame to a coordinate system may be verified and/or corrected using object identification and/or computer vision, as described above. For instance, and without limitation, an initial registration to two dimensions, represented for instance as registration to the x and y coordinates, may be performed using a two-dimensional projection of points in three dimensions onto a first frame, however. A third dimension of registration, representing depth and/or a z axis, may be detected by comparison of two frames; for instance, where first frame includes a pair of frames captured using a pair of cameras (e.g., stereoscopic camera also referred to in this disclosure as stereo-camera), image recognition and/or edge detection software may be used to detect a pair of stereoscopic views of images of an object; two stereoscopic views may be compared to derive z-axis values of points on object permitting, for instance, derivation of further z-axis points within and/or around the object using interpolation. This may be repeated with multiple objects in field of view, including without limitation environmental features of interest identified by object classifier and/or indicated by an operator. In an embodiment, x and y axes may be chosen to span a plane common to two cameras used for stereoscopic image capturing and/or an xy plane of a first frame; a result, x, and y translational components and q may be prepopulated in translational and rotational matrices, for affine transformation of coordinates of object, also as described above. Initial x and y coordinates and/or guesses at transformational matrices may alternatively or additionally be performed between first frame and second frame, as described above. For each point of a plurality of points on object and/or edge and/or edges of object as described above, x and y coordinates of a first stereoscopic frame may be populated, with an initial estimate of z coordinates based, for instance, on assumptions about object, such as an assumption that ground is substantially parallel to an xy plane as selected above. Z coordinates, and/or x, y, and z coordinates, registered using image capturing and/or object identification processes as described above may then be compared to coordinates predicted using initial guess at transformation matrices; an error function may be computed using by comparing the two sets of points, and new x, y, and/or z coordinates, may be iteratively estimated and compared until the error function drops below a threshold level. In some cases, a machine vision system may use a classifier, such as any classifier described throughout this disclosure.

Still referring to FIG. 1, an exemplary machine vision camera comprise camera 112. Non-limiting examples of an exemplary machine vision camera may include an OpenMV Cam H7 from OpenMV, LLC of Atlanta, Georgia, U.S.A. OpenMV Cam comprises a small, low power, microcontroller which allows execution of machine vision applications. OpenMV Cam comprises an ARM Cortex M7 processor and a 640×480 image sensor operating at a frame rate up to 150 fps. OpenMV Cam may be programmed with Python using a Remote Python/Procedure Call (RPC) library. OpenMV CAM may be used to operate image classification and segmentation models, such as without limitation by way of TensorFlow Lite; detection motion, for example by way of frame differencing algorithms; marker detection, for example blob detection; object detection, for example face detection; eye tracking; person detection, for example by way of a trained machine learning model; camera motion detection, for example by way of optical flow detection; code (barcode) detection and decoding; image capture; and video recording.

Still referring to FIG. 1, a camera 112 may include a stereo camera. As used in this disclosure, a "stereo-camera" is a camera that senses two or more images from two or more vantages. As used in this disclosure, a "vantage" is a location of a camera relative a scene, space and/or object which the camera is configured to sense. In some cases, a stereo-camera may determine depth of an object in a scene as a function of parallax. As used in this disclosure, "parallax" is a difference in perceived location of a corresponding object in two or more images. An exemplary stereo-camera is TaraXL from e-con Systems, Inc of San Jose, California. TaraXL is a USB 3.0 stereo-camera which is optimized for NVIDIA® Jetson AGX Xavier™/Jetson™ TX2 and NVIDIA GPU Cards. TaraXL's accelerated Software Development Kit (TaraXL SDK) is capable of doing high quality 3D depth mapping of WVGA at a rate of up to 60 frames per second. TaraXL is based on MT9V024 stereo sensor from ON Semiconductor. Additionally, TaraXL includes a global shutter, houses 6 inertial measurement units (IMUs), and allows mounting of optics by way of an S-mount lens holder. TaraXL may operate at depth ranges of about 50 cm to about 300 cm.

Still referring to FIG. 1, the processor 104 may be configured to convert the plurality image data into a combined video. As used in the current disclosure, a "combined video" is a video which combines the imaged data that is generated from each camera of the plurality of cameras into a single video. A combined video may be displayed as a panoramic video, 360 degree video, or a fisheye view video. In some embodiments, image data 116 may be stitched into one spherical and/or hemispherical combined video 120, and the color and contrast of each shot may be calibrated to be consistent with the others. This process is done either by the camera itself, or using processor 104 outfitted with specialized software that can analyze common visuals and audio to synchronize and link the different camera feeds together. Generally, the only area that cannot be viewed is the view toward the camera support. Processor 104 may combine the image data 116 as a function of the overlapping areas of the image data 116. Processor 104 may be configured to align the image and the timing of the image data 116 to produce seamless combined video 120. In some embodiments, a processor 104 may use an image machine learning model in order to generate a combined video 120.

Still referring to FIG. 1, processor 104 may perform calibration to ensure that, for instance, images from two or more cameras are combined seamlessly, a term which as used in this disclosure indicates the images are combined with imperceptible or negligible error; in other words, a person viewing a point where the images are combined, even at high magnification, may not be able to detect anomalies and/or edge locations of the two or more images. Calibration may be performed in multiple stages. A first stage may include a gross calibration that maps each image onto a hemisphere representing the full range of coverage of plurality of cameras; this initial or gross calibration may further include correction for aberrations. In a non-limiting embodiment, aberrations may be detected using an image classifier, which may be implemented using any type of image classification described below, and which may be trained using training examples pairing images containing aberrations with user-entered or otherwise obtained labels identifying aberrations, aberration types, or the like. Processor 104 may iteratively identify aberrations, modify relative angles, positions, and/or degrees of magnification of images, and repeat aberration identification until aberrations are no longer detected or are detected below a stored threshold level of pixels covered, degree of error represented by aberrations as computed using any error function described in this disclosure, or the like.

Continuing to refer to FIG. 1, a second adjustment and/or calibration step may be performed iteratively to detect aberrations introduced at the pixel level during operation and correct such aberrations; this may be done at regular intervals. Iterative calibration may be accomplished in any manner suitable for gross calibration, including processes to minimize and/or eliminate detected aberrations, error functions, or the like.

Still referring to FIG. 1, in some embodiments, and for instance but without limitation while performing gross and/or iterative calibration, a processor 104 may correct image 116 misalignments with images 116 from other cameras 112. Processor 104 may be configured to identify distinctive features can be found within each image 116 and then efficiently matched to rapidly establish correspondences between pairs of images. Processor 104 may be configured to align a plurality of image 116 on a pixel level. In some embodiment, processor 104 may be configured align the images as a function on camera 112 position and implement corrections for any misalignments. When multiple images exist in a panorama, techniques have been developed to compute a globally consistent set of alignments and to efficiently discover which images overlap one another. An image machine learning model may be used to determine the appropriate mathematical model relating pixel coordinates in one image to pixel coordinates in another. An image machine learning model may combine direct pixel-to-pixel comparisons with gradient descent (and other optimization techniques) can be used to estimate these pixel coordinates. A final compositing surface onto which to warp or projectivity transform and place all of the combined video 120 is needed. When combining the video the image machine learning model may be configured to seamlessly blend the overlapping images, even in the presence of parallax, lens distortion, scene motion, and exposure differences.

Still referring to FIG. 1, processor 104 may perform one or more modifications to transforms used to combine images as needed to correct for motion of a vessel and/or of cameras on the vessel. Modifications may be performed as a function of detecting a horizon in each camera's video and/or in combined video. For instance, and without limitation, processor 104 may be configured to identify horizon datum as a function of combined video 120. As used in the current disclosure, "horizon datum" is the location of the horizon within combined video 120. A horizon may be the visible line at which the earth's surface and the sky appear to meet. In some embodiments, processor 104 may constantly track and identify horizon datum within combined video 120. Processor 104 may additionally be configured to annotate the combined video 120 to highlight the horizon datum. Horizon datum may encompass a 360 degree view of the horizon within combined video 120. Processor 104 may be configured to identify horizon datum within the combined video despite movement of the cameras 112, elevated position, or the ship. Movement of the ship may include the natural pitch, roll, and yaw of the ship due to surf conditions.

Still referring to FIG. 1, processor 104 may be configured to embed geographical data within combined video 120. As used in the current disclosure, "geographical data" is an element of data concerning the geographic location of the combined video 120. Geographic data may include information regard the geographic position of the apparatus 100. Geographic data may additionally include the direction, elevation, and speed at which apparatus 100 is traveling. Geographic data may be used mark areas of interest and to identify horizons.

Figure 5:
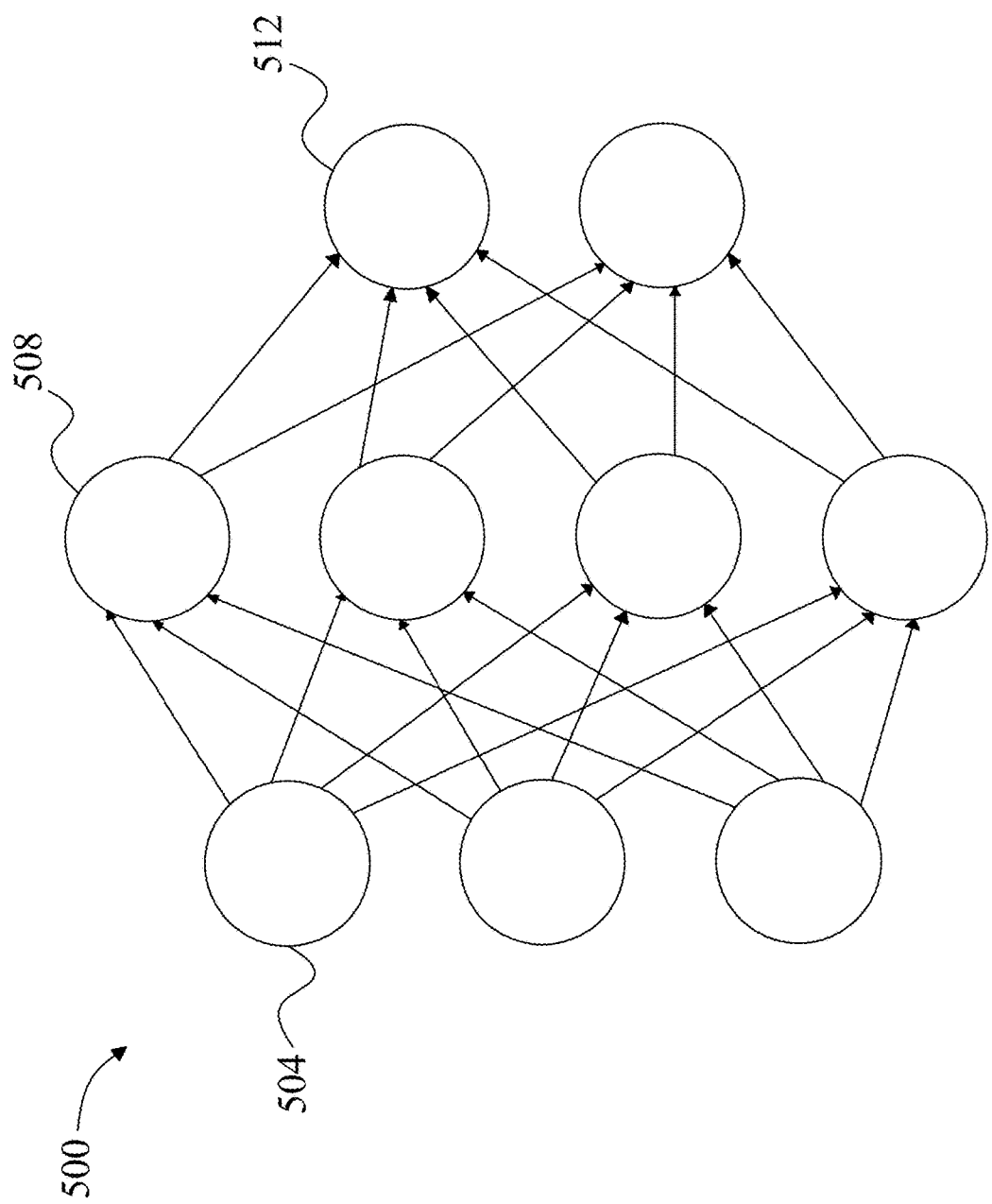
FIG. 5 is a diagram of an exemplary embodiment of neural network.

With continued reference to FIG. 1, processor 104 may generate a combined video 120 using an image machine learning model. As used in the current disclosure, a "image machine learning model" is a mathematical and/or algorithmic representation of a relationship between inputs and outputs. Image machine learning model may be similar to the machine learning model mentioned herein below with respect to FIG. 3. In embodiments, an image machine learning model may include a classifier, which may be consistent with the classifier disclosed with reference to FIG. 3. Additionally, the image machine learning model may use neural nets or convolutional neural nets, as shown in FIG. 5. Inputs to the to the image machine learning model may include image data 116, examples of combined video 120, and the like. The output of the image machine learning model may include combined video 120. Image machine learning model may by trained using image training data. Image training data is a plurality of data entries containing a plurality of inputs that are correlated to a plurality of outputs for training a processor 104 by a machine-learning process. Image training data may correlate exemplary image data to examples of combined videos corresponding to the exemplary image data. Image training data may include image data 116, examples combined video 120, geographical data, and the like. An "example of combined video," refers to a combined video 120 that was generated prior to the current time. Image training data may be stored in a database, such as a training data database, or remote data storage device, or a user input or device. In some embodiments, image training data may include image data collected by other apparatuses 100, or similar multicamera devices, correlated to combined video produced by those apparatuses 100 or similar multicamera devices. In some embodiments, the examples of combined video, or a portion of the examples of combined video, in image training data may contain labeled features. In some embodiments, these labeled features may be generated by a machine vision system. In some embodiments, these labeled featured may be manually created, for example, by a human.

Still referring to FIG. 1, image machine learning model may include and/or be incorporated in a video classifier. A video classifier may classify a sequence of images to an identification of an object, a hazard, and/or any other item of potential interest. In some embodiments, a video classifier may classify a sequence of images over time to an identification, such as without limitation a sequence of images showing a potentially hazardous object or condition moving toward a vessel and/or apparatus, which may be classified to an output indicating an imminent and/or potential hazard. In some embodiments, inputs to a video classifier may be generated from video and/or sequences of pictures using one or more processes and/or data structures used in and/or associated with video encoding, decoding, and/or compression algorithms. Such processes and/or data structures may include processes and/or data structures employed in video compression by inter-frame coding. The "inter" part of the term refers to the use of inter frame prediction. This kind of prediction tries to take advantage from temporal redundancy between neighboring frames enabling higher compression rates. Video data compression is the process of encoding information using fewer bits than the original representation. Any compression is either lossy or lossless. Lossless compression reduces bits by identifying and eliminating statistical redundancy. No information is lost in lossless compression. Lossy compression reduces bits by removing unnecessary or less important information. Typically, a device that performs data compression is referred to as an encoder, and one that performs the reversal of the process (decompression) as a decoder. Compression is useful because it reduces the resources required to store and transmit data. Computational resources are consumed in the compression and decompression processes. Data compression is subject to a space—time complexity trade-off. For instance, a compression scheme for video may require expensive hardware for the video to be decompressed fast enough to be viewed as it is being decompressed, and the option to decompress the video in full before watching it may be inconvenient or require additional storage. Video data may be represented as a series of still image frames. Such data usually contains abundant amounts of spatial and temporal redundancy. Video compression algorithms attempt to reduce redundancy and store information more compactly.

Further referring to FIG. 1, inter-frame coding may function by comparing each frame in the video with one or more previous frames. Individual frames of a video sequence may be compared from one frame to the next, and a video compression codec may send only the differences from a reference frame. If the frame contains areas where nothing has moved, such a system may issue a short command that copies that part of the previous frame into the next one. If sections of the frame move in a simple manner, the compressor may emit a (slightly longer) command that tells the decompressor to shift, rotate, lighten, or darken the copy. Changes in position of a block, image, or the like within a frame, and/or in an overall camera position as indicated by motion of a frame and/or picture relative to elements depicted therein may be described using one or more motion functions, where "motion functions" are defined for the purposes of this disclosure as motion vectors, which may include three-dimensional vectors representing motion through three-dimensional space and/or two dimensional vectors projecting such motion onto a screen, affine transformations such as four and/or six parameter affine transformations, or the like. Such motion functions may include, without limitation, (a) vectors and/or transformations indicating a motion of a camera, and thus of vessel, (b) vectors and/or transformations indicating motion and/or change in size, state, or the like of an object of interest. An affine transformation, as used herein, is a geometric transformation that preserves lines and parallelism, but not necessarily distances and angles. An affine transformation may be used to describe rotation, zooming, and warping, for instance using a vector describing a uniform displacement of a set of pixels or points represented in a video picture and/or picture, such as a set of pixels illustrating an object moving across a view in a video without changing apparent shape during motion. Affine transformations may be represented, without limitation, by 3×3 matrices, which may have varying elements depending on motions to be described. For instance, a translation affine transformation may represent motion of an object and/or video picture and/or sub-picture along one or more axes, a reflection affine transformation may represent a reflection of an object and/or video picture and/or sub-picture about an axis, a scale affine transformation may represent an increase and/or decrease of one or more dimensions of an object and/or video picture and/or sub-picture, such as without limitation an expansion along one or more axes indicative that an object is moving toward a camera, a contraction along one or more axes indicating that an object is receding from the camera, or the like, a rotation affine transformation may indication rotation about one or more axes, and a shear affine transformation may indicate a shearing of an object and/or picture, or representation thereof. Matrices for each such transformations may include constant parameters, functions such as trigonometric functions, or the like. Table 1 below indicates matrices that may be associated with two-dimensional affine transformations as described above, which are solely exemplary and not intended as a limiting or comprehensive list; $v_x$, and $v_y$ are component velocities, $c_x$ and $c_y$ are scaling and/or shearing factors, and $\theta$ is a degree through which a rotation is performed, in the below examples.

TABLE 1

Affine transformations and matrices.

| Transformation | Matrix |
|---|---|
| Translation | $\begin{bmatrix} 1 & 0 & v_x \\ 0 & 1 & v_y \\ 0 & 0 & 1 \end{bmatrix}$ |
| Scale | $\begin{bmatrix} c_x & 0 & 0 \\ 0 & c_y & 0 \\ 0 & 0 & 1 \end{bmatrix}$ |
| Rotation | $\begin{bmatrix} \cos(\theta) & -\sin(\theta) & 0 \\ \sin(\theta) & \cos(\theta) & 0 \\ 0 & 0 & 1 \end{bmatrix}$ |

TABLE 1-continued

Affine transformations and matrices.

| Transformation | Matrix |
|---|---|
| Shear | $\begin{bmatrix} 1 & c_x & 0 \\ c_y & 1 & 0 \\ 0 & 0 & 1 \end{bmatrix}$ |

Still referring to FIG., 1, an encoder may also transmit a residual signal which describes the remaining more subtle differences to the reference imagery. Using entropy coding, these residue signals have a more compact representation than the full signal. In areas of video with more motion, the compression must encode more data to keep up with the larger number of pixels that are changing. As used in this disclosure, reference frames are frames of a compressed video (a complete picture) that are used to define future frames. As such, they are only used in inter-frame compression techniques. Some modern video encoding standards, such as H.264/AVC, allow the use of multiple reference frames. This allows the video encoder to choose among more than one previously decoded frame on which to base each macroblock in the next frame. While the best frame for this purpose is usually the previous frame, the extra reference frames can improve compression efficiency and/or video quality. The two frame types used in inter-fame coding is P-frames and B-frames. A P-frame (Predicted picture) holds only the changes in the image from the previous frame. For example, in a scene where a car moves across a stationary background, only the car's movements need to be encoded. The encoder does not need to store the unchanging background pixels in the P-frame, thus saving space. A B-frame (Bidirectional predicted picture) saves even more space by using differences between the current frame and both the preceding and following frames to specify its content. An inter coded frame is divided into blocks known as macroblocks. A macroblock is a processing unit in image and video compression formats based on linear block transforms, typically the discrete cosine transform (DCT). A macroblock typically consists of 16×16 samples, and is further subdivided into transform blocks, and may be further subdivided into prediction blocks. Formats which are based on macroblocks include JPEG, where they are called MCU blocks, H.261, MPEG-1 Part 2, H.262/MPEG-2 Part 2, H.263, MPEG-4 Part 2, and H.264/MPEG-4 AVC. After the inter coded frame is divided into macroblocks, instead of directly encoding the raw pixel values for each block, the encoder will try to find a block similar to the one it is encoding on a previously encoded frame, referred to as a reference frame. This process is done by a block matching algorithm. If the encoder succeeds on its search, the block could be encoded by a vector, known as motion vector, which points to the position of the matching block at the reference frame. The process of motion vector determination is called motion estimation. In most cases the encoder will succeed, but the block found is likely not an exact match to the block it is encoding. This is why the encoder will compute the differences between them. Those residual values are known as the prediction error and need to be transformed and sent to the decoder. To sum up, if the encoder succeeds in finding a matching block on a reference frame, it will obtain a motion vector pointing to the matched block and a prediction error. Using both elements, the decoder will be able to recover the raw pixels of the block.

For example, audiovisual datum video file may be compressed using a P-frame algorithm and broken down into macroblocks. Individual still images taken from video record 128 can then be compared against a reference frame taken from the video file. A P-frame from video record 128 would only hold the changes in image from video file. Exemplary video compression codecs include without limitation H.26x codecs, MPEG formats, VVC, SVT-AV1, and the like. In some cases, compression may be lossy, in which some information may be lost during compression. Alternatively, or additionally, in some cases, compression may be substantially lossless, where substantially no information is lost during compression. In some cases, image component 116*a*-*b* may include a plurality of temporally sequential frames. In some cases, each frame may be encoded (e.g., bitmap or vector-based encoding). Each frame may be configured to be displayed by way of a display. Exemplary displays include without limitation light emitting diode (LED) displays, cathode ray tube (CRT) displays, liquid crystal displays (LCDs), organic LEDs (OLDs), quantum dot displays, projectors (e.g., scanned light projectors), and the like.

With continued reference to FIG. 1, a video classifier may perform one or more classification processes taking sequences of pictures, reference frames, motion functions, or the like as inputs, and outputs identifying one or more such reference frames, motion functions, objects, hazards or the like; video classifier may be trained using training data linking any such inputs to outputs, for instance based on user commands labeling inputs with data indicative of desired or correct outputs, or the like. Video classifier may perform and/or include a suite of one or more classifiers to perform tasks such as without limitation identifying and/or selecting a reference picture, identifying, using an image classifier, an object of interest within the reference picture, and/or matching a temporally arranged sequence of images and/or objects identified within images to motion functions. Such motion functions may be corrected for vessel motion such as that induced by swaying, waves, or the like as described elsewhere in this disclosure. Functions of motion may be indicated by one or more elements of data such as, without limitation, identifiers of function types such as vector, 4-parameter affine transformation, 6-parameter affine transformation, or the like, and coefficients, biases, and/or components thereof, such that any function of motion may, without limitation, be represented as an n-tuple of numbers for some value of n. Such n-tuples or other representations of functions of motion may be combined with image classifications as performed, without limitation, on one or more reference frames or the like, as inputs to a classifier matching identifications of objects combined with motion functions to one or more hazards, occurrences of interest, or the like. For instance, an image indicating a potential collision hazard such as a rock or another vessel, coupled with motion functions indicating that the vessel including apparatus is moving toward such potential collision hazard and/or that such potential collision hazard is moving toward vessel may be classified to an identification of an imminent and/or potential collision, which may cause issuance of an alarm and/or transmission of a video sector depicting such potential hazard to a console or other computing device. Alternatively or additionally, video classifiers may accept as inputs a temporal sequence of frames that may be directly classified to hazards, objects of interest, or the like, based on and/or as trained by training examples linking similar sequences of frames to similar hazards, objects of interest, or the like. Video encoding and/or compression techniques may alternatively or additionally be used to transmit and/or store video data efficiently, for instance by storage and/or transmission of reference pictures, residuals, and/or motion functions in lieu of entire sets of captured frames.

With continued reference to FIG. 1, the memory may contain additional instructions configuring the processor 104 to identify an area of interest as a function of the combined video 120. As used in the current disclosure, an "area of interest" is an object, area, or condition that is depicted in combined video 120 that may present a danger people or property. Examples of objects, area, and conditions may include weather conditions, surf conditions, wind conditions, other ships, vehicles, personnel, lose or moving equipment, various wildlife, man overboard, icebergs, docks, loading/unloading areas, deck, bridge, hull, rudder, hazardous areas, floating objects, submerged objects, reefs, sandbars, mooring balls, diver marks, fishing traps, lobster traps, crab traps, and the like. In a non-limiting example, a processor 104 may be configured to identify a member of personnel who has fallen overboard as an area of interest. In some embodiments, the processor 104 may visually track the location of the man overboard. In another non-limiting example, a processor 104 may be configured to identify sudden changes in the surf surrounding the ship as an area of interest. Processor 104 may additionally be configured to notify a user of an area of interest once it has been identified. In an embodiment, processor 104 may mark static areas of interest (i.e. reefs, docks, sand bars, and the like) as an element of using global positioning system. This marking may be included within geographic datum. An area of interest may be predetermined by a user. An area of interest may additionally be set as an "if then" condition. For example, if the state of the sea is 5 or higher on the Douglas Sea scale it may be considered an area of interest. The Douglas Sea scale is a scale which measures the height of the waves and measures the swell of the sea. The Douglas Sea scale may be expressed as a numerical value ranging from 1 to 10, wherein 1 corresponds to calm glassy seas and 10 corresponds to extraordinary rough seas.

With continued reference to FIG. 1, processor 104 may be configured to identify an area of interest as a function of a remote combined video generated from a plurality of sources. As used in the current disclosure, a "remote combined video" is a combined video 120 that has been generated by a camera that is remote from housing 108. Remote combined video may be generated concurrently from a remote camera or from the previously recorded remote combined video. A remote combined video may be generated from a plurality of cameras 112 that are remote from the current set of cameras. In an embodiment, cameras that generate a remote combined video may be located in an elevated position. In a non-limiting example, a remote combined video may be generated from a set of cameras located on a dock, light pole, mast of a ship nearby ships, and the like. Processor 104 may identify an area of interest using the historical combined video. Processor 104 may mark static areas of interest With continued reference to FIG. 1, processor 104 may identify an area of interest using an identification machine learning model. As used in the current disclosure, a "identification machine learning model" is a mathematical and/or algorithmic representation of a relationship between inputs and outputs. Identification machine learning model may be similar to the machine learning model mentioned herein below in FIG. 3. In embodiments, an identification machine learning model may include a classifier, which may be consistent with the classifier disclosed with reference to FIG. 3. Inputs to the to the identification machine learning model may include image data 116, combined video 120, examples of areas of interest, remote combined video, geographic datum, geographical data such as without limitation global positioning system (GPS) data, and the like. The output of the identification machine learning model may include identification of an area of interest and horizontal datum. Identification machine learning model may by trained using identification training data. Identification training data is a plurality of data entries containing a plurality of inputs that are correlated to a plurality of outputs for training a processor 104 by a machine-learning process. Identification training data may be configured to correlate combined video 120 as an input to an area of interest as an output. Identification training data may include image data 116, combined video 120, examples of areas of interest, and the like. Identification training data may include examples of areas of interest, "examples of areas of interest," refers to the areas of interest that were previously identified as areas of interest. Identification training data may be stored in a database, such as a training data database, or remote data storage device, or a user input or device. In some embodiment, training data may include image data and/or a combined video in which one or more areas of interest have been labeled. In some embodiments, these labels may be generated manually. In some embodiments, the image data and/or combined videos and the area of interest labels may be collected from previous use of apparatus 100. In some embodiments, the image data and/or combined videos and the area of interest labels may be collected from another apparatus 100, or a similar multicamera device.

Still referring to FIG. 1, an area of interest may be identified using a severity rating. As used in the current disclosure, a "severity rating" is a rating of the seriousness of an object, location, or area. Seriousness as used in the current disclosure may mean the potential for damage or injury to personnel, equipment, or wildlife presented by the current area of interest. A severity rating may be calculated as a function of the ships proximity to the object, location, or area. For example, if the ship is located 15 meters from a sand bar, it may be considered a very serious hazard to the ship. Conversely if the ship is located 500 meters from the same sand bar, it may be considered non-hazardous area. Additionally, a severity rating may incrementally increase the closer a ship, boat, or other vessel gets to the object, location, and or area.

Still referring to FIG. 1, training data for an or all machine-learning models, classifiers, or the like employed by processor 104 as described in this disclosure may be obtained from one or more additional devices (not shown) similar t device 100. Such data may include identifications of hazards as successfully performed by one or more devices, and/or implicitly or explicitly received identifications of hazards by user that have been input to one or more devices. Explicit identification may include selection and/or indication of a hazard by a user, for instance using a touchscreen, mouse, or the like. Implicit identification may include actions taken by a user, such as evasive maneuvers about an object whose image has been captured by cameras, sudden changes in course, velocity, acceleration, or the like, and/or detection of impacts; each such event may be detected by motion sensors as well as by changes in relative position of items captured in images. In some embodiments implicit identification may cause a user prompt requesting confirmation of a hazard. For instance, a verbal and/or textual message may display asking a user if a hazard has been detected, avoided, or otherwise encountered; a user may be able to enter confirmation, for instance by selecting or entering "yes," "no," or the like.

Further referring to FIG. 1, models may be trained iteratively using such continuously collected data; training of models may take place, without limitation, in the cloud, on one or more remote devices and/or servers, or the like; some or all training may be performed by shipboard and/or vessel-board computing device or devices. For instance, vessel-board computing device and/or devices may update models using data captured on board vessel, and transmit such updated models to processor 104 and/or to remote devices as communicative connection permits; updated models from remote devices may in turn be received by on-vessel computing device and/or devices and may be reconciled with existing models thereon or substituted therefor. Transmission of data to such remote devices may occur via satellite connections, ship-to-ship or vessel-to-vessel communication networks, and/or when a vessel is located in a harbor or marina or otherwise in range of a wireless or other Internet connection. In some embodiments, models trained on remote devices may be received, downloaded, and/or updated by processor 104 over a communicative connection to such remote devices; for instance, and without limitation parameters, biases, coefficients, or the like for a given model may be downloaded and/or updated on processor 104 as training iteratively changes and improves tuning of such parameters, biases, coefficients, and the like. Processor 104 may, for instance, use a GPU or other processor capable of parallel processing to deploy and run models for image identification, hazard detection, and the like. As a further non-limiting example, a CPU, one, two, six, or more cores and/or CPUs, and/or on-system hardware may perform supervisory actions, run motion compensation transformations, and/or track objects that have been identified; such CPUs and/or hardware may also manage wireless communication, power management, memory management, and the like. Combinations of images into a single stream may, in some embodiments, be performed using hardware, including but not without limitation on an FPGA or other configurable hardware platform.

Continuing to refer to FIG. 1, a severity rating may be calculated on a scale such as a scale from 1-10, wherein a rating of 1 may be a very little potential for damage whereas a rating of 10 may be an extremely urgent situation where lives are at risk. In other embodiments, a severity rating may be display using various ordinal scales such as the use of words, colors, auditory notifications, visual notifications, and the like. For example, severity rating may be displayed using a color system such as green for a low potential for damage to persons or equipment, yellow for a moderate potential, and red for high potential. In another non-limiting example, a severity rating may be displayed using words instead of numbers, words may include "No Danger," "Low Risk of Danger," "Moderate Risk of Danger," "High Risk of Danger." A severity rating may rate each individual identified area of interest. A severity rating may be generated from an identification of an area of interest or combined video 120. An identification machine learning model may be configured to calculate a severity rating. Identification training data may be configured to correlate an identified area of interest as an input to a severity rating as an output. In some embodiments, the severity ratings may be manually generated, such as by a human.

Still referring to FIG. 1, processor 104 and/or one or more models operating on processor and/or device may perform object and/or hazard tracking as well as recognition. For instance, and without limitation, where processor 104 and/or device 100 has detected an object of interest and/or hazard, processor 104 and/or device 100 may track where such object of interest and/or hazard is and/or is moving to in relation to device 100 and/or a vessel on which device is located. In some embodiments, for instance, if a hazard is moving away from device and/or vessel, and/or if device and/or vessel is away from a hazard, processor 104 may decrease severity level of the hazard or may indicate that it no longer qualifies as a hazard. Alternatively, if a distance between device and/or vessel and hazard is decreasing, severity level may be increased. In other words, if an object is moving away or changing bearing, a model determining degree of hazard may be trained and/or configured to recognize should recognize the situation pertaining to that object as no and/or low risk, while the same object with constant bearing and decreasing range may be interpreted as a high and/or urgent risk. Training data for any or all machine-learning models and/or classifiers may include correlations of relative increase and/or decrease in distance and/or changes in heading to labels of hazards in sequences of images, permitting models to be configured, by way of training, to identify hazards based on appearance as well as heading, relative position, and/or collision prediction.

In some embodiments, calculating the ranking may include linear regression techniques. Processor 104 may be designed and configured to create a machine-learning model using techniques for development of linear regression models. Linear regression models may include ordinary least squares regression, which aims to minimize the square of the difference between predicted outcomes and actual outcomes according to an appropriate norm for measuring such a difference (e.g., a vector-space distance norm); coefficients of the resulting linear equation may be modified to improve minimization. Linear regression models may include ridge regression methods, where the function to be minimized includes the least-squares function plus term multiplying the square of each coefficient by a scalar amount to penalize large coefficients. Linear regression models may include least absolute shrinkage and selection operator (LASSO) models, in which ridge regression is combined with multiplying the least-squares term by a factor of 1 divided by double the number of samples. Linear regression models may include a multi-task lasso model wherein the norm applied in the least-squares term of the lasso model is the Frobenius norm mounting to the square root of the sum of squares of all terms. Linear regression models may include the elastic net model, a multi-task elastic net model, a least angle regression model, a LARS lasso model, an orthogonal matching pursuit model, a Bayesian regression model, a logistic regression model, a stochastic gradient descent model, a perceptron model, a passive aggressive algorithm, a robustness regression model, a Huber regression model, or any other suitable model that may occur to persons skilled in the art upon reviewing the entirety of this disclosure. Linear regression models may be generalized in an embodiment to polynomial regression models, whereby a polynomial equation (e.g., a quadratic, cubic or higher-order equation) providing a best predicted output/actual output fit is sought; similar methods to those described above may be applied to minimize error functions, as will be apparent to persons skilled in the art upon reviewing the entirety of this disclosure.

Still referring to FIG. 1, processor may be configured to generate a machine learning model, such as identification machine learning model, using a Naïve Bayes classification algorithm. Naïve Bayes classification algorithm generates classifiers by assigning class labels to problem instances, represented as vectors of element values. Class labels are drawn from a finite set. Naïve Bayes classification algorithm may include generating a family of algorithms that assume that the value of a particular element is independent of the value of any other element, given a class variable. Naïve Bayes classification algorithm may be based on Bayes Theorem expressed as P(A/B)=P(B/A) P(A)÷P(B), where P(AB) is the probability of hypothesis A given data B also known as posterior probability; P(B/A) is the probability of data B given that the hypothesis A was true; P(A) is the probability of hypothesis A being true regardless of data also known as prior probability of A; and P(B) is the probability of the data regardless of the hypothesis. A naïve Bayes algorithm may be generated by first transforming training data into a frequency table. Processor 104 may then calculate a likelihood table by calculating probabilities of different data entries and classification labels. Processor 104 may utilize a naïve Bayes equation to calculate a posterior probability for each class. A class containing the highest posterior probability is the outcome of prediction. Naïve Bayes classification algorithm may include a gaussian model that follows a normal distribution. Naïve Bayes classification algorithm may include a multinomial model that is used for discrete counts. Naïve Bayes classification algorithm may include a Bernoulli model that may be utilized when vectors are binary.

Still referring to FIG. 1, processor may be configured to generate a machine learning model, such as identification machine learning model, using a K-nearest neighbors (KNN) algorithm. A "K-nearest neighbors algorithm" as used in this disclosure, includes a classification method that utilizes feature similarity to analyze how closely out-of-sample-features resemble training data to classify input data to one or more clusters and/or categories of features as represented in training data; this may be performed by representing both training data and input data in vector forms, and using one or more measures of vector similarity to identify classifications within training data, and to determine a classification of input data. K-nearest neighbors algorithm may include specifying a K-value, or a number directing the classifier to select the k most similar entries training data to a given sample, determining the most common classifier of the entries in the database, and classifying the known sample; this may be performed recursively and/or iteratively to generate a classifier that may be used to classify input data as further samples. For instance, an initial set of samples may be performed to cover an initial heuristic and/or "first guess" at an output and/or relationship, which may be seeded, without limitation, using expert input received according to any process as described herein. As a non-limiting example, an initial heuristic may include a ranking of associations between inputs and elements of training data. Heuristic may include selecting some number of highest-ranking associations and/or training data elements.

With continued reference to FIG. 1, generating k-nearest neighbors algorithm may generate a first vector output containing a data entry cluster, generating a second vector output containing an input data, and calculate the distance between the first vector output and the second vector output using any suitable norm such as cosine similarity, Euclidean distance measurement, or the like. Each vector output may be represented, without limitation, as an n-tuple of values, where n is at least two values. Each value of n-tuple of values may represent a measurement or other quantitative value associated with a given category of data, or attribute, examples of which are provided in further detail below; a vector may be represented, without limitation, in n-dimensional space using an axis per category of value represented in n-tuple of values, such that a vector has a geometric direction characterizing the relative quantities of attributes in the n-tuple as compared to each other. Two vectors may be considered equivalent where their directions, and/or the relative quantities of values within each vector as compared to each other, are the same; thus, as a non-limiting example, a vector represented as [5, 10, 15] may be treated as equivalent, for purposes of this disclosure, as a vector represented as [1, 2, 3]. Vectors may be more similar where their directions are more similar, and more different where their directions are more divergent; however, vector similarity may alternatively or additionally be determined using averages of similarities between like attributes, or any other measure of similarity suitable for any n-tuple of values, or aggregation of numerical similarity measures for the purposes of loss functions as described in further detail below. Any vectors as described herein may be scaled, such that each vector represents each attribute along an equivalent scale of values. Each vector may be "normalized," or divided by a "length" attribute, such as a length attribute l as derived using a Pythagorean norm: $l=\sqrt{\sum_{i=0}^{n} a_i^2}$, where $a_i$ is attribute number experience of the vector. Scaling and/or normalization may function to make vector comparison independent of absolute quantities of attributes, while preserving any dependency on similarity of attributes; this may, for instance, be advantageous where cases represented in training data are represented by different quantities of samples, which may result in proportionally equivalent vectors with divergent values.

Figure 2:
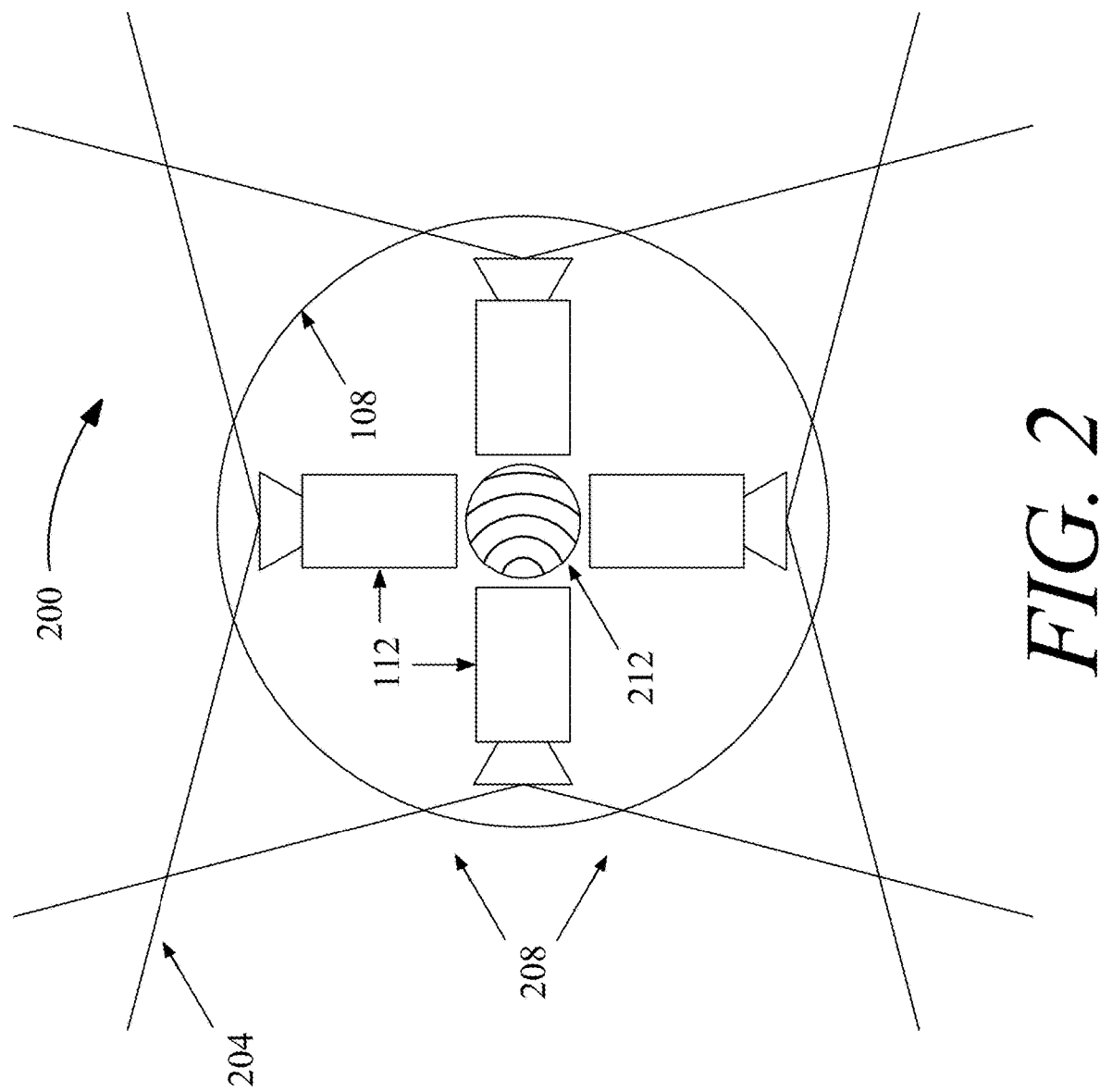
FIG. 2 is diagram illustrating an exemplary embodiment of an elevated lookout apparatus.

Referring now to FIG. 2, an aerial view of an apparatus 200 an elevated lookout is illustrated. FIG. 2. illustrates a plurality of cameras 112 positioned radially in a manner to generate a combined field of view 204. FIG. 2. further illustrates an exemplary embodiment of a birds eye view of a horizontal field of view. As a used in the current disclosure, a "field of view" is the area that is seen at any given moment by a camera. In an embodiment, a field of view 208 may be comprised of both a horizontal field of view and a vertical field of view. In some embodiments, the horizontal or vertical field of view may overlap as shown in FIG. 2. The overlap of the field of view 208 of the plurality of cameras 112 may prevent any blind spots in the combined field of view 204. The size of the field of view 208 and the size of the camera's imager directly affect the image resolution (one determining factor in accuracy). A field of view 208 may be taken from each camera of a plurality of cameras 112. The size of a field of view 208 may be represented in terms of degrees, whereas the center of the camera 112 lens may be the vertex of the angle. In embodiments, a field of view 208 for each camera 112 may be represented as two angles. The first angle representing the horizontal field of view and a second angle representing the vertical field of view.

With continued reference to FIG. 2., illustrates an exemplary embodiment of a combined field of view 204. As used in the current disclosure, a "combined field of view" is the overlapping of the field of view 208 of each camera of the plurality of cameras. In an embodiment, a combined field of view may be calculated by the addition of the field of view 208 from each camera of a plurality of cameras 112 minus the overlapped section of each field of view 208. In some embodiments, any permanent obstruction of the field of view 208 may also be subtracted from the combined field of view 204. An example of a permanent obstruction may comprise the building, pole, or structure that creates the elevated position. The pole or structure that comprises the elevated position may always obstruct a portion the vertical field of view of the cameras. This obstruction may be subtracted from the combined field of 204 to depict a more accurate field of view. A combined field of view may also be broken down into a combined horizontal field of view and a combined vertical field of view. A combined field of view may be the combination of both the horizontal and vertical field of view. In a non-limiting example, a first camera has a horizontal field of view 208 of 100 degrees while a second camera also has a horizontal field of view 208 of 100 degrees. The field of view 208 of both of these cameras have an overlap 30 degrees. The combined horizontal field of view 204 of these cameras 112 may be 170 degrees. This process may be repeated until the field of view for all cameras of the plurality of cameras 112 are accounted for. In a non-limiting, a combined field of view 204 where both the combined horizontal and vertical field of view are 360 degrees may appear as a complete sphere around the housing 108. In another non limiting example, a combined field of view 204 where both the horizontal is 360 degrees, and the combined vertical field of view is 180 degrees may appear as a half of a sphere. The sphere may be facing up or down as a function of the combined vertical field of view of 180 degrees.

With continued reference to FIG. 2, housing 108 may be configured to be mechanically attached to an elevated location 212. As used in the current disclosure, an "elevated location" is an area that is raised above the ground or its surrounding area. Examples of an elevated location 212 may include a light pole, electricity pole, flagpole, bridge, buildings, a ships mast, other raised structures, and the like.

With continued reference to FIG. 2, a plurality of cameras 112 may be positioned radially within the at least a housing 108. As used within the current disclosure, "positioned radially" may mean that the cameras 112 are positioned along a radius of a housing 108. In an embodiment, positioned radially may mean that the cameras 112 are positioned along the radius emanating from the center point of an elevated location 212. In an embodiment, a plurality of cameras 112 may be positioned as to have a central visual axis 216 that is not parallel to adjacent ac. As used in the current disclosure a "central visual axis" is a straight line that passes through both the center lens of a camera 112. This may be done to ensure that the combined field of view 204 of the plurality of cameras 112 is not overlapping excessively. This also may be done to expand the combined field of view. In embodiments, a plurality of cameras 112 may comprise three, four, five, or six cameras. The number of camera that are present within the apparatus may be determined by the type of style of cameras 112. The number of cameras that are present within the housing 108 may be determined as a function of a desired combined field of view.

With continued reference to FIG. 2, cameras 112 may be pivotally mounted within the housing 108. As used within the current disclosure, "pivotally mounted" means the camera 112 is mounted in manner to allow each camera to rotate. Pivotally mounted may be configured to rotate both horizontally and vertically. Cameras may use a plurality of actuators to rotate either horizontally or vertically. Processor 104 may be communicatively connected to the actuators. Processor 104 may be configured to pivot cameras 112 using an actuator. In embodiments, the plurality of cameras 112 may be configured to pivot in sync with each other. In other embodiments, cameras 112 may configured to pivot to track horizon datum. An actuator may include a component of a machine that is responsible for moving and/or controlling a mechanism or system. An actuator may, in some cases, require a control signal and/or a source of energy or power. In some cases, a control signal may be relatively low energy. Exemplary control signal forms include electric potential or current, pneumatic pressure or flow, or hydraulic fluid pressure or flow, mechanical force/torque or velocity, or even human power. In some cases, an actuator may have an energy or power source other than control signal. This may include a main energy source, which may include for example electric power, hydraulic power, pneumatic power, mechanical power, and the like. In some cases, upon receiving a control signal, an actuator responds by converting source power into mechanical motion. In some cases, an actuator may be understood as a form of automation or automatic control.

With continued reference to FIG. 2, in some embodiments, actuator may include a hydraulic actuator. A hydraulic actuator may consist of a cylinder or fluid motor that uses hydraulic power to facilitate mechanical operation. Output of hydraulic actuator may include mechanical motion, such as without limitation linear, rotatory, or oscillatory motion. In some cases, hydraulic actuator may employ a liquid hydraulic fluid. As liquids, in some cases. are incompressible, a hydraulic actuator can exert large forces. Additionally, as force is equal to pressure multiplied by area, hydraulic actuators may act as force transformers with changes in area (e.g., cross sectional area of cylinder and/or piston). An exemplary hydraulic cylinder may consist of a hollow cylindrical tube within which a piston can slide. In some cases, a hydraulic cylinder may be considered single acting. Single acting may be used when fluid pressure is applied substantially to just one side of a piston. Consequently, a single acting piston can move in only one direction. In some cases, a spring may be used to give a single acting piston a return stroke. In some cases, a hydraulic cylinder may be double acting. Double acting may be used when pressure is applied substantially on each side of a piston; any difference in resultant force between the two sides of the piston causes the piston to move.

With continued reference to FIG. 2, in some embodiments, actuator may include a pneumatic actuator. In some cases, a pneumatic actuator may enable considerable forces to be produced from relatively small changes in gas pressure. In some cases, a pneumatic actuator may respond more quickly than other types of actuators, for example hydraulic actuators. A pneumatic actuator may use compressible flued (e.g., air). In some cases, a pneumatic actuator may operate on compressed air. Operation of hydraulic and/or pneumatic actuators may include control of one or more valves, circuits, fluid pumps, and/or fluid manifolds.

With continued reference to FIG. 2, in some cases, actuator may include an electric actuator. Electric actuator may include any of electromechanical actuators, linear motors, and the like. In some cases, actuator may include an electromechanical actuator. An electromechanical actuator may convert a rotational force of an electric rotary motor into a linear movement to generate a linear movement through a mechanism. Exemplary mechanisms, include rotational to translational motion transformers, such as without limitation a belt, a screw, a crank, a cam, a linkage, a scotch yoke, and the like. In some cases, control of an electromechanical actuator may include control of electric motor, for instance a control signal may control one or more electric motor parameters to control electromechanical actuator. Exemplary non-limitation electric motor parameters include rotational position, input torque, velocity, current, and potential. electric actuator may include a linear motor.

Linear motors may differ from electromechanical actuators, as power from linear motors is output directly as translational motion, rather than output as rotational motion and converted to translational motion. In some cases, a linear motor may cause lower friction losses than other devices. Linear motors may be further specified into at least 3 different categories, including flat linear motor, U-channel linear motors and tubular linear motors. Linear motors may controlled be directly controlled by a control signal for controlling one or more linear motor parameters. Exemplary linear motor parameters include without limitation position, force, velocity, potential, and current.

With continued reference to FIG. 2, in some embodiments, an actuator may include a mechanical actuator. In some cases, a mechanical actuator may function to execute movement by converting one kind of motion, such as rotary motion, into another kind, such as linear motion. An exemplary mechanical actuator includes a rack and pinion. In some cases, a mechanical power source, such as a power take off may serve as power source for a mechanical actuator. Mechanical actuators may employ any number of mechanism, including for example without limitation gears, rails, pulleys, cables, linkages, and the like.

Figure 3:
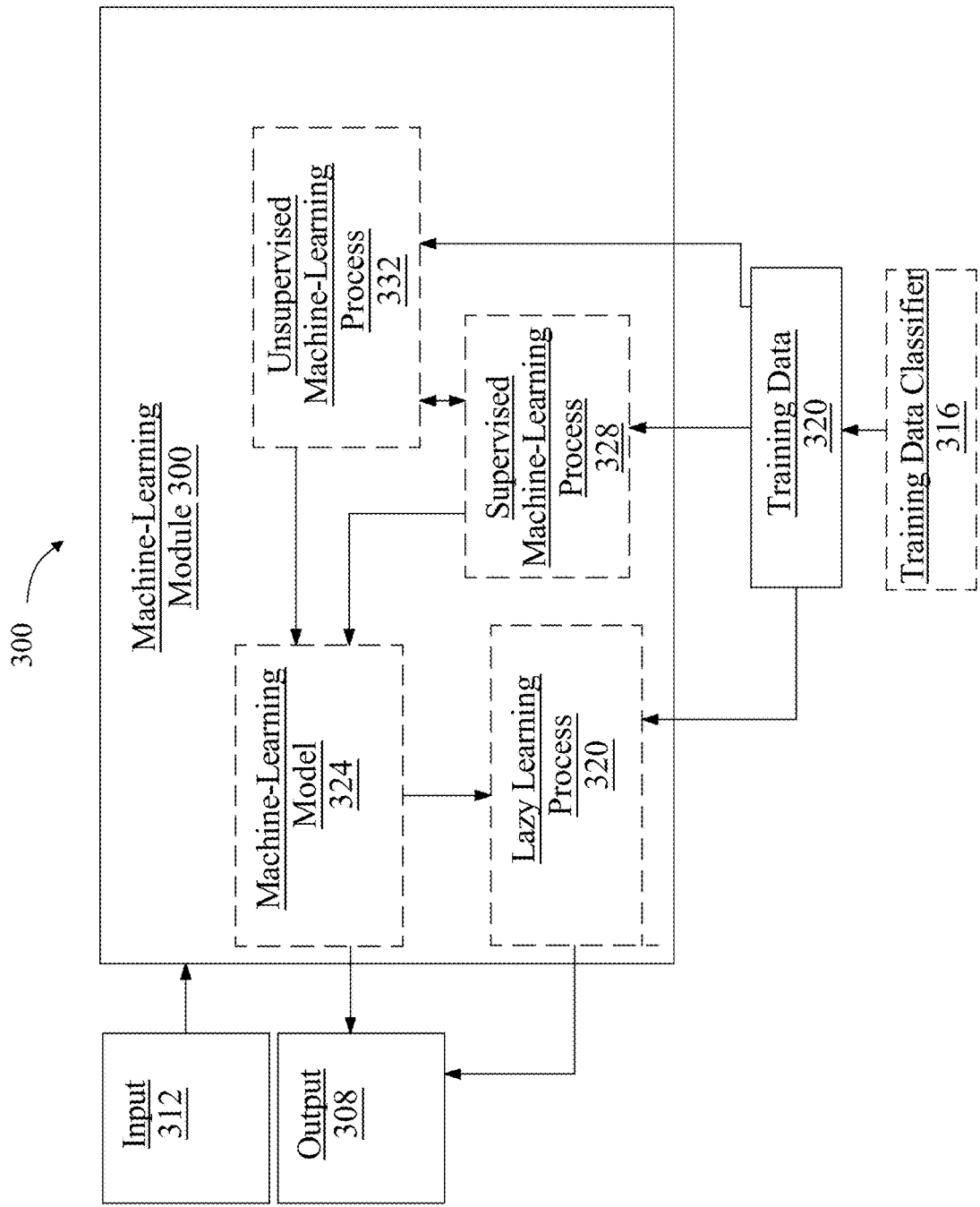
FIG. 3 is a block diagram of an exemplary machine-learning process.

Still referring to FIG. 3, "training data," as used herein, is data containing correlations that a machine-learning process may use to model relationships between two or more categories of data elements. For instance, and without limitation, training data 304 may include a plurality of data entries, each entry representing a set of data elements that were recorded, received, and/or generated together; data elements may be correlated by shared existence in a given data entry, by proximity in a given data entry, or the like. Multiple data entries in training data 304 may evince one or more trends in correlations between categories of data elements; for instance, and without limitation, a higher value of a first data element belonging to a first category of data element may tend to correlate to a higher value of a second data element belonging to a second category of data element, indicating a possible proportional or other mathematical relationship linking values belonging to the two categories. Multiple categories of data elements may be related in training data 304 according to various correlations; correlations may indicate causative and/or predictive links between categories of data elements, which may be modeled as relationships such as mathematical relationships by machine-learning processes as described in further detail below. Training data 304 may be formatted and/or organized by categories of data elements, for instance by associating data elements with one or more descriptors corresponding to categories of data elements. As a non-limiting example, training data 304 may include data entered in standardized forms by persons or processes, such that entry of a given data element in a given field in a form may be mapped to one or more descriptors of categories. Elements in training data 304 may be linked to descriptors of categories by tags, tokens, or other data elements; for instance, and without limitation, training data 304 may be provided in fixed-length formats, formats linking positions of data to categories such as comma-separated value (CSV) formats and/or self-describing formats such as extensible markup language (XML), JavaScript Object Notation (JSON), or the like, enabling processes or devices to detect categories of data.

Referring now to FIG. 3, an exemplary embodiment of a machine-learning module 300 that may perform one or more machine-learning processes as described in this disclosure is illustrated. Machine-learning module may perform determinations, classification, and/or analysis steps, methods, processes, or the like as described in this disclosure using machine learning processes. A "machine learning process," as used in this disclosure, is a process that automatedly uses training data 304 to generate an algorithm that will be performed by a computing device/module to produce outputs 308 given data provided as inputs 312; this is in contrast to a non-machine learning software program where the commands to be executed are determined in advance by a user and written in a programming language.

Alternatively, or additionally, and continuing to refer to FIG. 3, training data 304 may include one or more elements that are not categorized; that is, training data 304 may not be formatted or contain descriptors for some elements of data. Machine-learning algorithms and/or other processes may sort training data 304 according to one or more categorizations using, for instance, natural language processing algorithms, tokenization, detection of correlated values in raw data and the like; categories may be generated using correlation and/or other processing algorithms. As a non-limiting example, in a corpus of text, phrases making up a number "n" of compound words, such as nouns modified by other nouns, may be identified according to a statistically significant prevalence of n-grams containing such words in a particular order; such an n-gram may be categorized as an element of language such as a "word" to be tracked similarly to single words, generating a new category as a result of statistical analysis. Similarly, in a data entry including some textual data, a person's name may be identified by reference to a list, dictionary, or other compendium of terms, permitting ad-hoc categorization by machine-learning algorithms, and/or automated association of data in the data entry with descriptors or into a given format. The ability to categorize data entries automatedly may enable the same training data 304 to be made applicable for two or more distinct machine-learning algorithms as described in further detail below. Training data 304 used by machine-learning module 300 may correlate any input data as described in this disclosure to any output data as described in this disclosure.

Further referring to FIG. 3, training data may be filtered, sorted, and/or selected using one or more supervised and/or unsupervised machine-learning processes and/or models as described in further detail below; such models may include without limitation a training data classifier 316. Training data classifier 316 may include a "classifier," which as used in this disclosure is a machine-learning model as defined below, such as a mathematical model, neural net, or program generated by a machine learning algorithm known as a "classification algorithm," as described in further detail below, that sorts inputs into categories or bins of data, outputting the categories or bins of data and/or labels associated therewith. A classifier may be configured to output at least a datum that labels or otherwise identifies a set of data that are clustered together, found to be close under a distance metric as described below, or the like. Machine-learning module 300 may generate a classifier using a classification algorithm, defined as a processes whereby a computing device and/or any module and/or component operating thereon derives a classifier from training data 304. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers.

Still referring to FIG. 3, machine-learning module 300 may be configured to perform a lazy-learning process 320 and/or protocol, which may alternatively be referred to as a "lazy loading" or "call-when-needed" process and/or protocol, may be a process whereby machine learning is conducted upon receipt of an input to be converted to an output, by combining the input and training set to derive the algorithm to be used to produce the output on demand. For instance, an initial set of simulations may be performed to cover an initial heuristic and/or "first guess" at an output and/or relationship. As a non-limiting example, an initial heuristic may include a ranking of associations between inputs and elements of training data 304. Heuristic may include selecting some number of highest-ranking associations and/or training data 304 elements. Lazy learning may implement any suitable lazy learning algorithm, including without limitation a K-nearest neighbors algorithm, a lazy naïve Bayes algorithm, or the like; persons skilled in the art, upon reviewing the entirety of this disclosure, will be aware of various lazy-learning algorithms that may be applied to generate outputs as described in this disclosure, including without limitation lazy learning applications of machine-learning algorithms as described in further detail below.

Alternatively or additionally, and with continued reference to FIG. 3, machine-learning processes as described in this disclosure may be used to generate machine-learning models 324. A "machine-learning model," as used in this disclosure, is a mathematical and/or algorithmic representation of a relationship between inputs and outputs, as generated using any machine-learning process including without limitation any process as described above and stored in memory; an input is submitted to a machine-learning model 324 once created, which generates an output based on the relationship that was derived. For instance, and without limitation, a linear regression model, generated using a linear regression algorithm, may compute a linear combination of input data using coefficients derived during machine-learning processes to calculate an output datum. As a further non-limiting example, a machine-learning model 324 may be generated by creating an artificial neural network, such as a convolutional neural network comprising an input layer of nodes, one or more intermediate layers, and an output layer of nodes. Connections between nodes may be created via the process of "training" the network, in which elements from a training data 304 set are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

Still referring to FIG. 3, machine-learning algorithms may include at least a supervised machine-learning process 328. At least a supervised machine-learning process 328, as defined herein, include algorithms that receive a training set relating a number of inputs to a number of outputs, and seek to find one or more mathematical relations relating inputs to outputs, where each of the one or more mathematical relations is optimal according to some criterion specified to the algorithm using some scoring function. For instance, a supervised learning algorithm may include an area of interest, image datum 116, combined video 120, and the like as described above as inputs, autonomous functions as outputs, and a scoring function representing a desired form of relationship to be detected between inputs and outputs; scoring function may, for instance, seek to maximize the probability that a given input and/or combination of elements inputs is associated with a given output to minimize the probability that a given input is not associated with a given output. Scoring function may be expressed as a risk function representing an "expected loss" of an algorithm relating inputs to outputs, where loss is computed as an error function representing a degree to which a prediction generated by the relation is incorrect when compared to a given input-output pair provided in training data 304. Persons skilled in the art, upon reviewing the entirety of this disclosure, will be aware of various possible variations of at least a supervised machine-learning process 328 that may be used to determine relation between inputs and outputs. Supervised machine-learning processes may include classification algorithms as defined above.

Further referring to FIG. 3, machine learning processes may include at least an unsupervised machine-learning processes 332. An unsupervised machine-learning process, as used herein, is a process that derives inferences in datasets without regard to labels; as a result, an unsupervised machine-learning process may be free to discover any structure, relationship, and/or correlation provided in the data. Unsupervised processes may not require a response variable; unsupervised processes may be used to find interesting patterns and/or inferences between variables, to determine a degree of correlation between two or more variables, or the like.

Still referring to FIG. 3, machine-learning module 300 may be designed and configured to create a machine-learning model 324 using techniques for development of linear regression models. Linear regression models may include ordinary least squares regression, which aims to minimize the square of the difference between predicted outcomes and actual outcomes according to an appropriate norm for measuring such a difference (e.g., a vector-space distance norm); coefficients of the resulting linear equation may be modified to improve minimization. Linear regression models may include ridge regression methods, where the function to be minimized includes the least-squares function plus term multiplying the square of each coefficient by a scalar amount to penalize large coefficients. Linear regression models may include least absolute shrinkage and selection operator (LASSO) models, in which ridge regression is combined with multiplying the least-squares term by a factor of 1 divided by double the number of samples. Linear regression models may include a multi-task lasso model wherein the norm applied in the least-squares term of the lasso model is the Frobenius norm amounting to the square root of the sum of squares of all terms. Linear regression models may include the elastic net model, a multi-task elastic net model, a least angle regression model, a LARS lasso model, an orthogonal matching pursuit model, a Bayesian regression model, a logistic regression model, a stochastic gradient descent model, a perceptron model, a passive aggressive algorithm, a robustness regression model, a Huber regression model, or any other suitable model that may occur to persons skilled in the art upon reviewing the entirety of this disclosure. Linear regression models may be generalized in an embodiment to polynomial regression models, whereby a polynomial equation (e.g., a quadratic, cubic or higher-order equation) providing a best predicted output/actual output fit is sought; similar methods to those described above may be applied to minimize error functions, as will be apparent to persons skilled in the art upon reviewing the entirety of this disclosure.

Continuing to refer to FIG. 3, machine-learning algorithms may include, without limitation, linear discriminant analysis. Machine-learning algorithm may include quadratic discriminate analysis. Machine-learning algorithms may include kernel ridge regression. Machine-learning algorithms may include support vector machines, including without limitation support vector classification-based regression processes. Machine-learning algorithms may include stochastic gradient descent algorithms, including classification and regression algorithms based on stochastic gradient descent. Machine-learning algorithms may include nearest neighbors algorithms. Machine-learning algorithms may include Gaussian processes such as Gaussian Process Regression. Machine-learning algorithms may include cross-decomposition algorithms, including partial least squares and/or canonical correlation analysis. Machine-learning algorithms may include naïve Bayes methods. Machine-learning algorithms may include algorithms based on decision trees, such as decision tree classification or regression algorithms. Machine-learning algorithms may include ensemble methods such as bagging meta-estimator, forest of randomized tress, AdaBoost, gradient tree boosting, and/or voting classifier methods. Machine-learning algorithms may include neural net algorithms, including convolutional neural net processes.

For example, and still referring to FIG. 3, neural network also known as an artificial neural network, is a network of "nodes," or data structures having one or more inputs, one or more outputs, and a function determining outputs based on inputs. Such nodes may be organized in a network, such as without limitation a convolutional neural network, including an input layer of nodes, one or more intermediate layers, and an output layer of nodes. Connections between nodes may be created via the process of "training" the network, in which elements from a training dataset are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

Still referring to FIG. 3, a node may include, without limitation a plurality of inputs $x_i$ that may receive numerical values from inputs to a neural network containing the node and/or from other nodes. Node may perform a weighted sum of inputs using weights $w_i$ that are multiplied by respective inputs $x_i$. Additionally or alternatively, a bias b may be added to the weighted sum of the inputs such that an offset is added to each unit in the neural network layer that is independent of the input to the layer. The weighted sum may then be input into a function $\varphi$, which may generate one or more outputs y. Weight $w_i$ applied to an input $x_i$ may indicate whether the input is "excitatory," indicating that it has strong influence on the one or more outputs y, for instance by the corresponding weight having a large numerical value, and/or a "inhibitory," indicating it has a weak effect influence on the one more inputs y, for instance by the corresponding weight having a small numerical value. The values of weights $w_i$ may be determined by training a neural network using training data, which may be performed using any suitable process as described above. In an embodiment, and without limitation, a neural network may receive semantic units as inputs and output vectors representing such semantic units according to weights $w_i$ that are derived using machine-learning processes as described in this disclosure.

Figure 4:
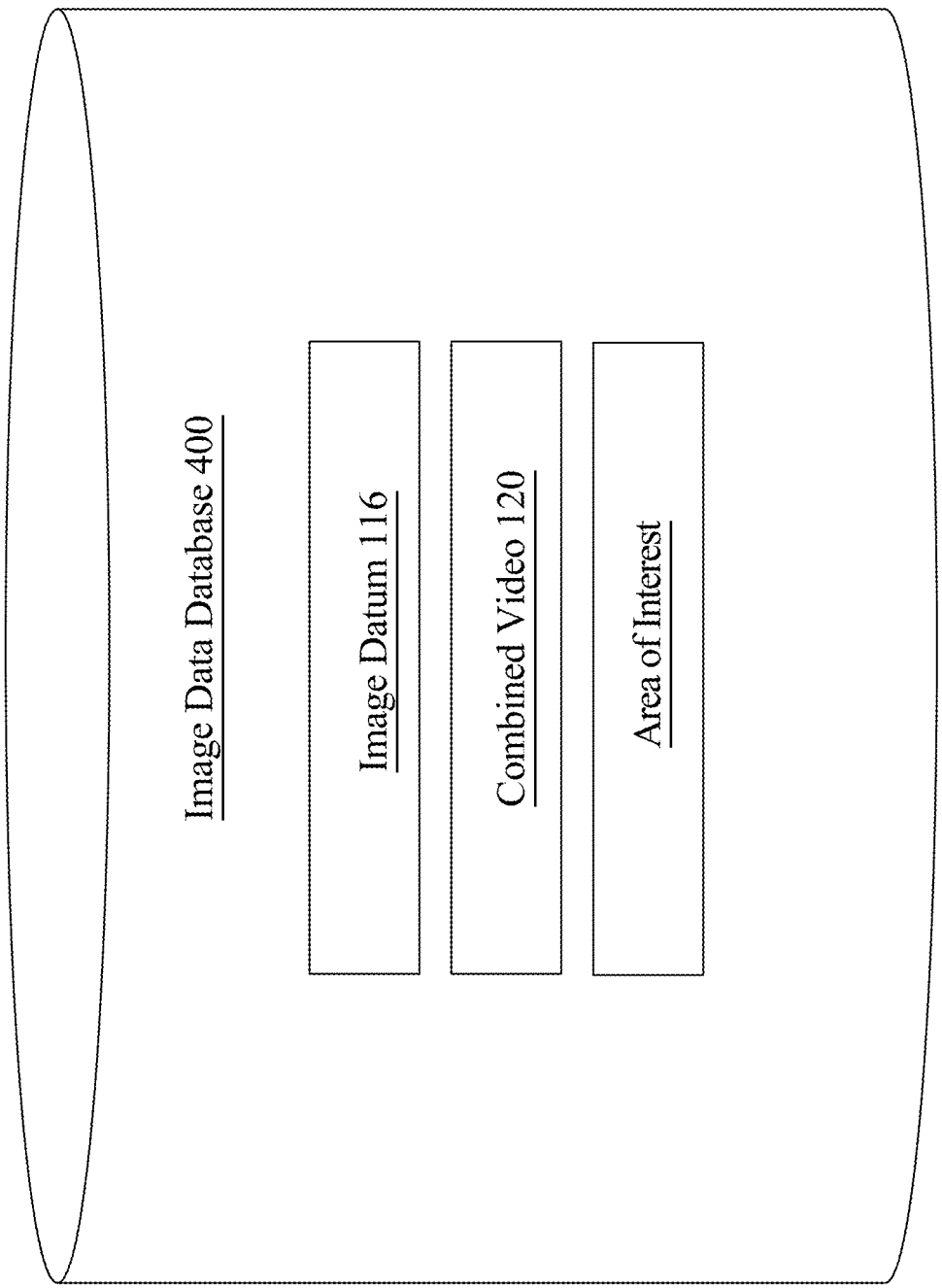
FIG. 4 is a block diagram of an exemplary embodiment of an image data database.

Now referring to FIG. 4, an exemplary image data database 400 is illustrated by way of block diagram. In an embodiment, an area of interest, image datum 116, combined video 120, and the like may be stored in an exemplary image database 400 (also referred to as "database"). Processor 104 may be communicatively connected with image data database 400. For example, in some cases, database 400 may be local to processor 104. Alternatively or additionally, in some cases, database 400 may be remote to processor 104 and communicative with processor 104 by way of one or more networks. Network may include, but not limited to, a cloud network, a mesh network, or the like. By way of example, a "cloud-based" system, as that term is used herein, can refer to a system which includes software and/or data which is stored, managed, and/or processed on a network of remote servers hosted in the "cloud," e.g., via the Internet, rather than on local severs or personal computers. A "mesh network" as used in this disclosure is a local network topology in which the infrastructure processor 104 connect directly, dynamically, and non-hierarchically to as many other computing devices as possible. A "network topology" as used in this disclosure is an arrangement of elements of a communication network. Image data database 400 may be implemented, without limitation, as a relational database, a key-value retrieval database such as a NOSQL database, or any other format or structure for use as a database that a person skilled in the art would recognize as suitable upon review of the entirety of this disclosure. Image data database 400 may alternatively or additionally be implemented using a distributed data storage protocol and/or data structure, such as a distributed hash table or the like. Image data database 400 may include a plurality of data entries and/or records as described above. Data entries in a database may be flagged with or linked to one or more additional elements of information, which may be reflected in data entry cells and/or in linked tables such as tables related by one or more indices in a relational database. Persons skilled in the art, upon reviewing the entirety of this disclosure, will be aware of various ways in which data entries in a database may store, retrieve, organize, and/or reflect data and/or records as used herein, as well as categories and/or populations of data consistently with this disclosure.

Referring now to FIG. 5, an exemplary embodiment of neural network 500 is illustrated. A neural network 500 also known as an artificial neural network, is a network of "nodes," or data structures having one or more inputs, one or more outputs, and a function determining outputs based on inputs. Such nodes may be organized in a network, such as without limitation a convolutional neural network, including an input layer of nodes 504, one or more intermediate layers 508, and an output layer of nodes 512. Connections between nodes may be created via the process of "training" the network, in which elements from a training dataset are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning. Connections may run solely from input nodes toward output nodes in a "feed-forward" network or may feed outputs of one layer back to inputs of the same or a different layer in a "recurrent network." As a further non-limiting example, a neural network may include a convolutional neural network comprising an input layer of nodes, one or more intermediate layers, and an output layer of nodes. A "convolutional neural network," as used in this disclosure, is a neural network in which at least one hidden layer is a convolutional layer that convolves inputs to that layer with a subset of inputs known as a "kernel," along with one or more additional layers such as pooling layers, fully connected layers, and the like.

Figure 6:
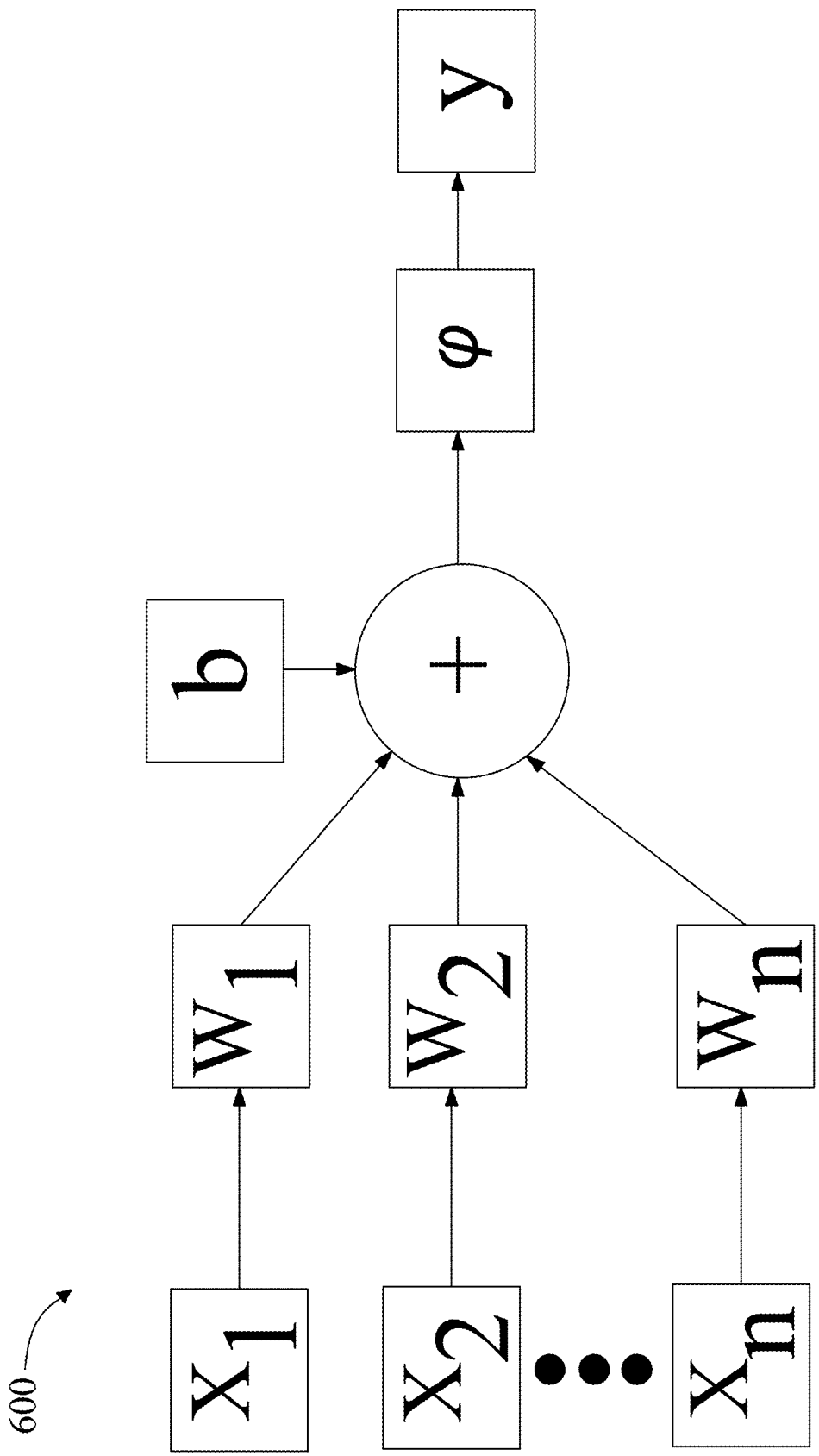
FIG. 6 is a diagram of an exemplary embodiment of a node of a neural network

Referring now to FIG. 6, an exemplary embodiment of a node of a neural network is illustrated. A node may include, without limitation a plurality of inputs xi that may receive numerical values from inputs to a neural network containing the node and/or from other nodes. Node may perform a weighted sum of inputs using weights wi that are multiplied by respective inputs xi. Additionally or alternatively, a bias b may be added to the weighted sum of the inputs such that an offset is added to each unit in the neural network layer that is independent of the input to the layer. The weighted sum may then be input into a function φ, which may generate one or more outputs y. Weight wi applied to an input xi may indicate whether the input is "excitatory," indicating that it has strong influence on the one or more outputs y, for instance by the corresponding weight having a large numerical value, and/or a "inhibitory," indicating it has a weak effect influence on the one more inputs y, for instance by the corresponding weight having a small numerical value. The values of weights wi may be determined by training a neural network using training data, which may be performed using any suitable process as described above.

Figure 7:
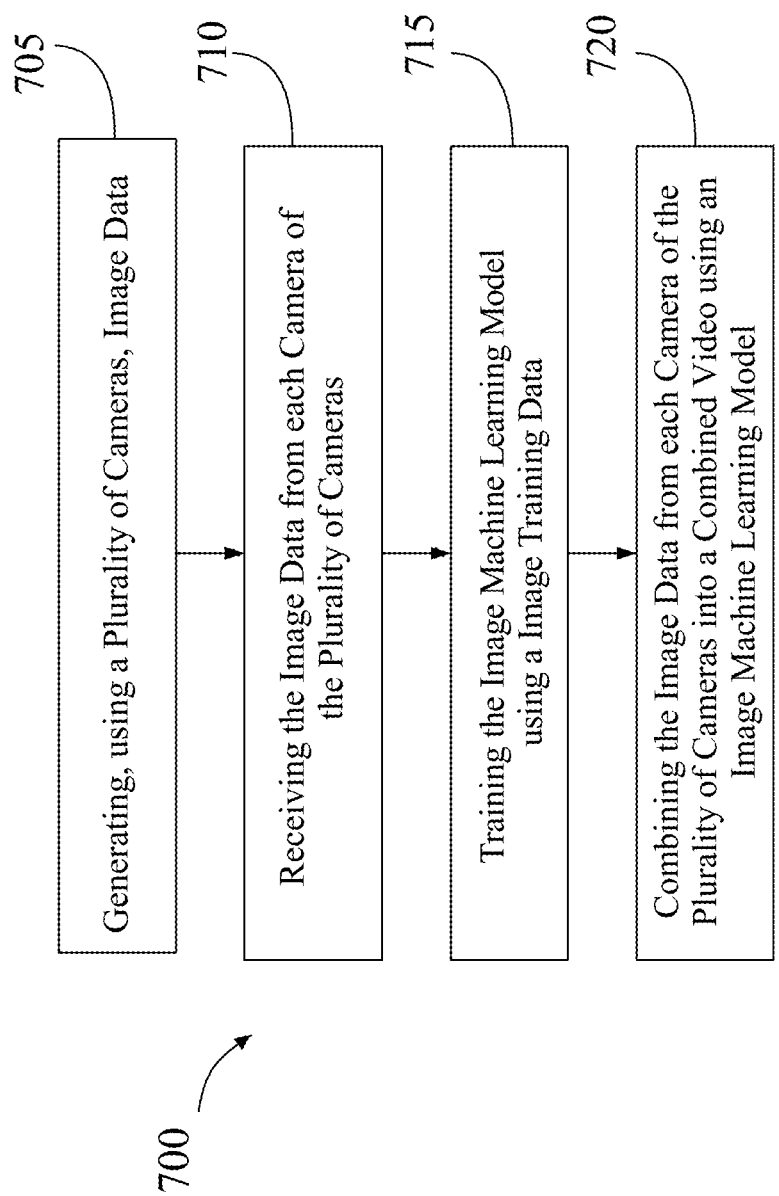
FIG. 7 is a flow diagram of an exemplary method of use for an elevated lookout.

Referring to FIG. 7, an exemplary method 700 of use for an elevated lookout. Method 700 incudes a step 705, of generating, using each camera of a plurality of cameras, an image data, wherein the plurality of cameras are positioned radially within the at least a housing in a manner to generate a combined field of view, wherein the at least a housing is mounted in an elevated location. This may occur as described above in reference to FIGS. 1-6. In an embodiment, the plurality of cameras may have a central visual axis that is not parallel to one another. In another embodiment, the combined field of view is calculated by adding the field of view of each camera of the plurality of cameras. Additionally, the combined field of view is calculated exclusive of permanent obstacles. The combined field of view may be represented as an angle. The combined field of view may also be comprised of a combined vertical field of view and a combined horizontal field of view.

With continued reference to FIG. 7, method 700 includes a step 710 of receiving, using at least a processor, the image data from each camera of the plurality of cameras. This may occur as described above in reference to FIGS. 1-6.

With continued reference to FIG. 7, method 700 includes a step 715 of training, using the at least a processor, the image machine learning model using an image training data, wherein the image training data contains a plurality of image data as inputs correlated to the combined video as an output. This may occur as described above in reference to FIGS. 1-6.

With continued reference to FIG. 7, method 700 includes a step 720 of combining, using the at least a processor, the image data from each camera of the plurality of cameras into a combined video. This may occur as described above in reference to FIGS. 1-6. In some embodiments, the method may include identifying, using the at least a processor, an area of interest as a function of the combined video. A notification may be issued to a user as a function of the identification of the area of interest. In other embodiments, an area of interest may be identified using an identification machine learning model. A combined video may be generated using an image machine learning model.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 8:
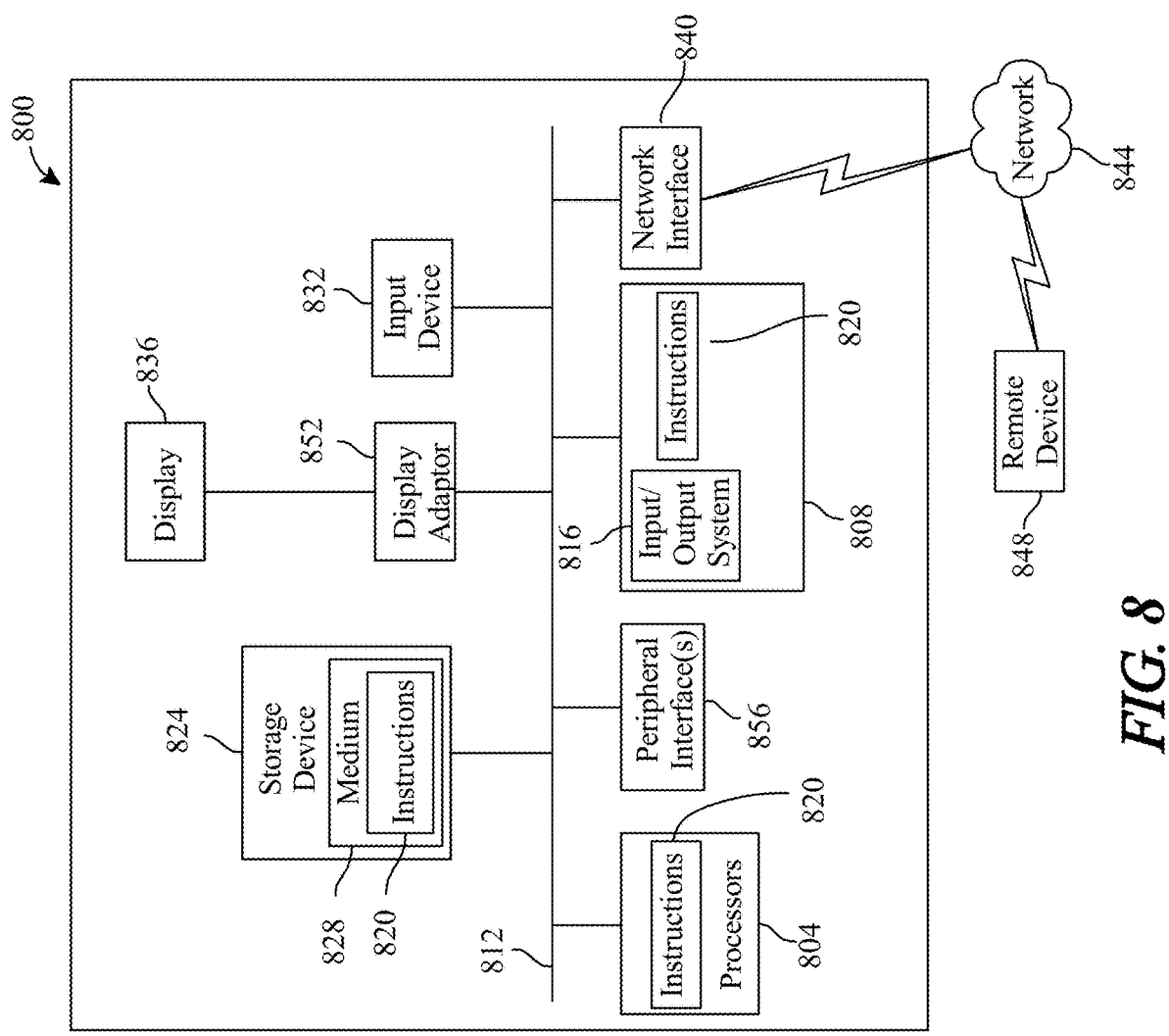
FIG. 8 is a block diagram of a computing system that can be used to implement any one-off the drawings are not necessarily to scale and may be illustrated by phantom lines, diagrammatic representations, and fragmentary views. In certain instances, details that are not necessary for an understanding of the embodiments or that render other details difficult to perceive may have been omitted.

FIG. 8 shows a diagrammatic representation of one embodiment of a computing device in the exemplary form of a computer system 800 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 800 includes a processor 804 and a memory 808 that communicate with each other, and with other components, via a bus 812. Bus 812 may include any of several types of bus structures including, but not limited to, a memory bus, a memory controller, a peripheral bus, a local bus, and any combinations thereof, using any of a variety of bus architectures.

Processor 804 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; processor 804 may be organized according to Von Neumann and/or Harvard architecture as a non-limiting example. Processor 804 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating point unit (FPU), and/or system on a chip (SoC).

Memory 808 may include various components (e.g., machine-readable media) including, but not limited to, a random-access memory component, a read only component, and any combinations thereof. In one example, a basic input/output system 816 (BIOS), including basic routines that help to transfer information between elements within computer system 800, such as during start-up, may be stored in memory 808. Memory 808 may also include (e.g., stored on one or more machine-readable media) instructions (e.g., software) 820 embodying any one or more of the aspects and/or methodologies of the present disclosure. In another example, memory 808 may further include any number of program modules including, but not limited to, an operating system, one or more application programs, other program modules, program data, and any combinations thereof.

Computer system 800 may also include a storage device 824. Examples of a storage device (e.g., storage device 824) include, but are not limited to, a hard disk drive, a magnetic disk drive, an optical disc drive in combination with an optical medium, a solid-state memory device, and any combinations thereof. Storage device 824 may be connected to bus 812 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 824 (or one or more components thereof) may be removably interfaced with computer system 800 (e.g., via an external port connector (not shown)). Particularly, storage device 824 and an associated machine-readable medium 828 may provide nonvolatile and/or volatile storage of machine-readable instructions, data structures, program modules, and/or other data for computer system 800. In one example, software 820 may reside, completely or partially, within machine-readable medium 828. In another example, software 820 may reside, completely or partially, within processor 804.

Computer system 800 may also include an input device 832. In one example, a user of computer system 800 may enter commands and/or other information into computer system 800 via input device 832. Examples of an input device 832 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 832 may be interfaced to bus 812 via any of a variety of interfaces (not shown) including, but not limited to, a serial interface, a parallel interface, a game port, a USB interface, a FIREWIRE interface, a direct interface to bus 812, and any combinations thereof. Input device 832 may include a touch screen interface that may be a part of or separate from display 838, discussed further below. Input device 832 may be utilized as a user selection device for selecting one or more graphical representations in a graphical interface as described above.

A user may also input commands and/or other information to computer system 800 via storage device 824 (e.g., a removable disk drive, a flash drive, etc.) and/or network interface device 840. A network interface device, such as network interface device 840, may be utilized for connecting computer system 800 to one or more of a variety of networks, such as network 844, and one or more remote devices 848 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 844, may employ a wired and/or a wireless mode of communication. In general, any network topology may be used. Information (e.g., data, software 820, etc.) may be communicated to and/or from computer system 800 via network interface device 840.

Computer system 800 may further include a video display adapter 852 for communicating a displayable image to a display device, such as display device 836. Examples of a display device include, but are not limited to, a liquid crystal display (LCD), a cathode ray tube (CRT), a plasma display, a light emitting diode (LED) display, and any combinations thereof. Display adapter 852 and display device 836 may be utilized in combination with processor 804 to provide graphical representations of aspects of the present disclosure. In addition to a display device, computer system 800 may include one or more other peripheral output devices including, but not limited to, an audio speaker, a printer, and any combinations thereof. Such peripheral output devices may be connected to bus 812 via a peripheral interface 856. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods, systems, and software according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions, and additions may be made to that which is specifically disclosed herein without departing from the spirit and scope of the present invention.

What is claimed is:

1. An elevated lookout apparatus, wherein the apparatus comprises:
    at least a housing mounted in an elevated location;
    a plurality of cameras positioned radially within the at least a housing in a manner to create a combined field of view, wherein each camera of the plurality of cameras is configured to generate image data; and
    at least a processor; and
    a memory communicatively connected to the at least a processor and the plurality of cameras, the memory containing instructions configuring the at least a processor to:
        receive the image data from each camera of the plurality of cameras; and
        train an image machine learning model using image training data, wherein image training data correlates exemplary image data as inputs to examples of combined videos as an output; and
        combine the image data from each camera of the plurality of cameras into a combined video using the trained image machine learning model;
        identify a horizon datum as a function of the combined video using an identification learning model, wherein the identification machine learning model is configured to receive the combined video as an input and output an area of interest and the horizon datum; and
        identify the area of interest utilizing a severity rating calculated as a function of a proximity between the elevated lookout apparatus and the area of interest.

2. The apparatus of claim 1, wherein the memory contains instructions further configuring the at least a processor to issue a notification to a user as a function of the identification of the area of interest.

3. The apparatus of claim 1, wherein the area of interest is identified using an identification machine learning model.

4. The apparatus of claim 1, wherein the elevated location comprises a mast.

5. The apparatus of claim 1, wherein the plurality of cameras each have a central visual axis that is not parallel to one another.

6. The apparatus of claim 1, wherein the combined field of view is calculated by adding the field of view of each camera of the plurality of cameras.

7. The apparatus of claim 6, wherein the combined field of view is calculated exclusive of the areas of overlap between a field of view of each camera of the plurality of cameras.

8. The apparatus of claim 1, wherein the combined field of view is calculated exclusive of permanent obstacles.

9. The apparatus of claim 1, wherein the plurality of cameras comprises a machine vision system.

10. A method of use for an elevated lookout apparatus, wherein the method comprises:
    generating, using each camera of a plurality of cameras, image data, wherein the plurality of cameras are positioned radially within the at least a housing in a manner to create a combined field of view, wherein the at least a housing is mounted in an elevated location;
    receiving, using at least a processor, the image data from each camera of the plurality of cameras; and
    training, using the at least a processor, an image machine learning model using image training data, wherein image training data correlates exemplary image data as inputs to examples of combined videos as an output; and
    combining, using the at least a processor, the image data from each camera of the plurality of cameras into a combined video using the trained image machine learning model;
    identifying a horizon datum using an identification learning model, wherein the identification machine learning model is configured to receive the combined video as an input and output an area of interest and the horizon datum; and
    identifying the area of interest utilizing a severity rating calculated as a function of a proximity between the elevated lookout apparatus and the area of interest.

11. The method of claim 10, wherein the method further comprises issuing, using the at least a processor, a notification to a user as a function of the identification of the area of interest.

12. The method of claim 10, wherein the area of interest is identified using an identification machine learning model.

13. The method of claim 10, wherein the elevated location comprises a mast.

14. The method of claim 10, wherein the plurality of cameras each have a central visual axis that is not parallel to one another.

15. The method of claim 10, wherein the method further comprises calculating, using the at least a processor, the combined field of view by adding the field of view of each camera of the plurality of cameras.

16. The method of claim 15, wherein the method further comprises calculating, using the at least a processor, the combined field of view exclusive of the areas of overlap between a field of view of each camera of the plurality of cameras.

17. The method of claim 10, wherein the combined field of view is calculated exclusive of permanent obstacles.

18. The method of claim 10, wherein the plurality of cameras comprises a machine vision system.

* * * * *